(12) United States Patent
Kojima et al.

(10) Patent No.: US 8,349,397 B2
(45) Date of Patent: Jan. 8, 2013

(54) PLASTIC LENS, MANUFACTURING METHOD THEREOF, AND MANUFACTURING METHOD OF HARD COAT LIQUID

(75) Inventors: Hiroshi Kojima, Tokyo (JP); Tsuyoshi Sakurazawa, Tokyo (JP); Minoru Ito, Tokyo (JP)

(73) Assignee: Hoya Corporation, Tokyo (JP)

( * ) Notice: Subject to any disclaimer, the term of this patent is extended or adjusted under 35 U.S.C. 154(b) by 678 days.

(21) Appl. No.: 12/474,823

(22) Filed: May 29, 2009

(65) Prior Publication Data

US 2009/0297807 A1    Dec. 3, 2009

(30) Foreign Application Priority Data

May 30, 2008 (JP) ................. 2008-143600
Jun. 25, 2008 (JP) ................. 2008-166074
Jun. 25, 2008 (JP) ................. 2008-166075

(51) Int. Cl.
    *B05D 5/06* (2006.01)
(52) U.S. Cl. .................. 427/164; 427/162
(58) Field of Classification Search .......... 427/162, 427/164
    See application file for complete search history.

(56) References Cited

U.S. PATENT DOCUMENTS 5,165,992 A    11/1992    Yajima

FOREIGN PATENT DOCUMENTS

| EP | 0 922 971 A1 | 6/1999 |
| EP | 0922971 | * 6/1999 |
| EP | 1 041 404 A2 | 10/2000 |
| EP | 1 162 245 A1 | 12/2001 |
| EP | 1 323 770 A1 | 7/2003 |
| EP | 1 752 797 A2 | 2/2007 |
| EP | 1 775 120 A1 | 4/2007 |
| EP | 1 895 333 A1 | 3/2008 |
| GB | 2 320 019 A | 6/1998 |
| GB | 2320019 | * 6/1998 |
| JP | 9-136978 | 5/1997 |
| JP | 2002-129102 | 5/2002 |
| JP | 2008-020756 | * 1/2008 |
| JP | 2008-20756 | 1/2008 |
| WO | WO 2007/018108 A2 | 2/2007 |

OTHER PUBLICATIONS

Extended European Search Report issued Aug. 11, 2009 in EP 09 16 1446.

* cited by examiner

*Primary Examiner* — Elizabeth Burkhart
(74) *Attorney, Agent, or Firm* — Oblon, Spivak, McClelland, Maier & Neustadt, L.L.P.

(57) ABSTRACT

A manufacturing method of plastic lens includes the steps of: preparing a first liquid containing at least one metal oxide and a second liquid containing at least one organosilicon compound; manufacturing a hard coat liquid by mixing the first liquid and the second liquid so that the mass ratio of the solid content of the first liquid to the solid content of second liquid falls within a range of 45/55 to 65/35; and coating the hard coat liquid on a plastic lens substrate to form a hard coat film and then curing the hard coat film.

16 Claims, 6 Drawing Sheets

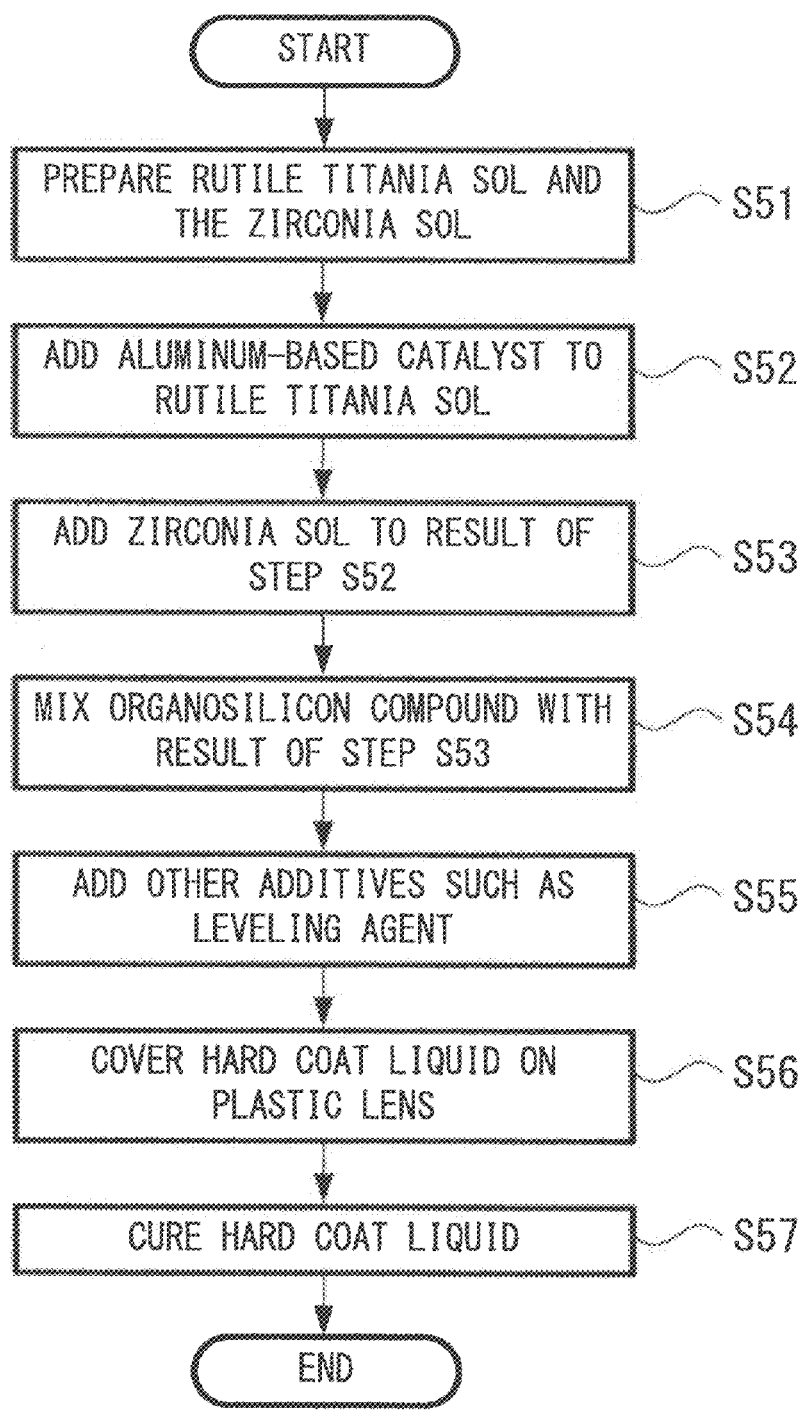

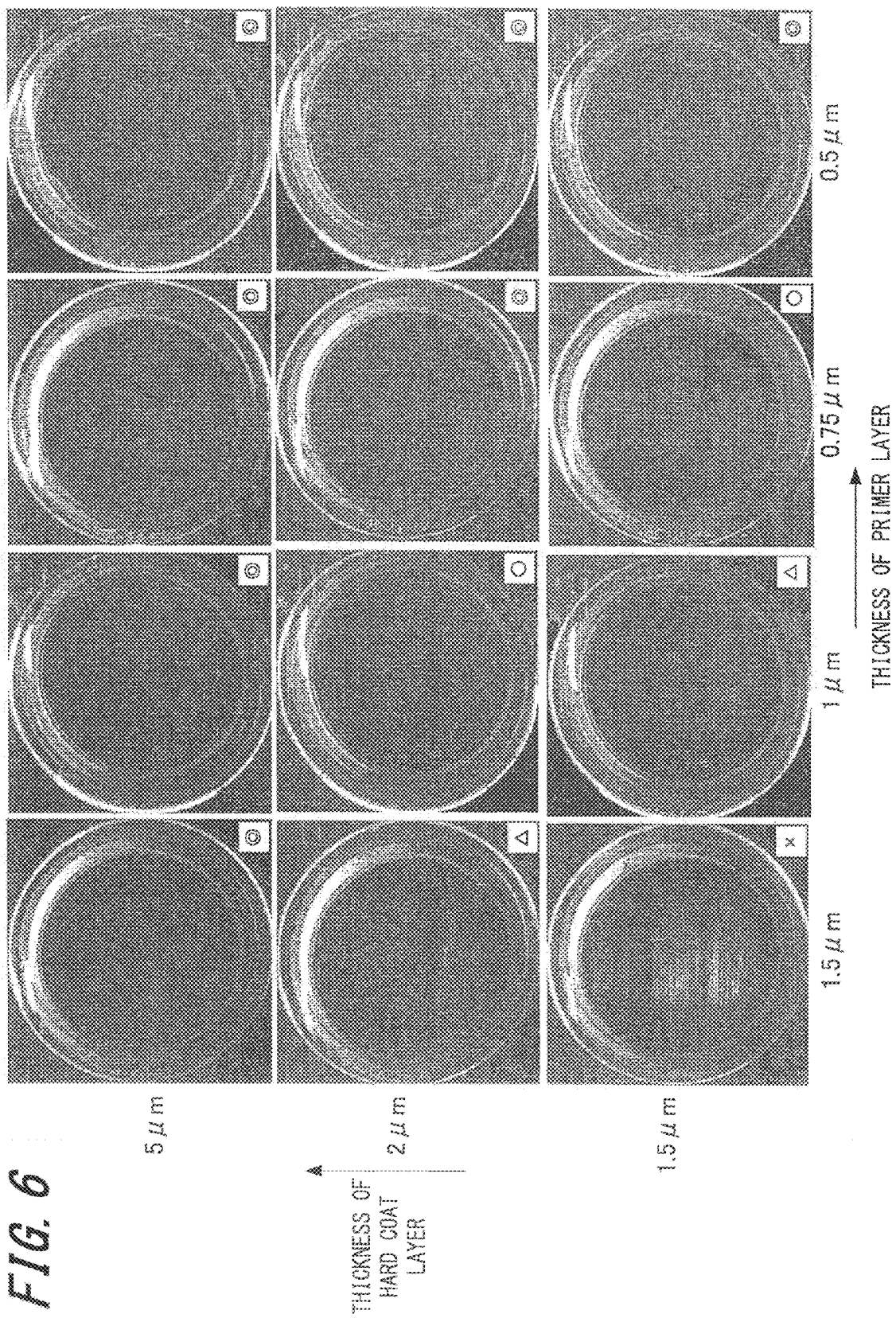

PLASTIC LENS, MANUFACTURING METHOD THEREOF, AND MANUFACTURING METHOD OF HARD COAT LIQUID

BACKGROUND OF THE INVENTION

1. Field of the Invention

The present invention relates to a spectacle plastic lens (particularly a spectacle plastic lens having high refractive index), a manufacturing method thereof, and a manufacturing method of a hard coat liquid.

2. Description of the Related Art

In recent years, many efforts have been made to develop a high refractive index plastic lens in order to reduce the thickness of spectacle plastic lenses. Although having many advantages such as lighter weight, better processability and higher impact resistance, the plastic lens is lower in hardness and therefore is inferior compared to a glass lens in terms of scratch resistance and weather resistance. For this reason, the plastic lens is generally covered with a hard film called "hard coat" especially when being used as spectacle lenses. In the case of the spectacle lenses, since an antireflection film is formed on the surface of the hard coat, hard coat material is required to have high refractive index, otherwise interference fringes will occur due to refractive index difference between the hard coat and the lens.

In order to obtain such a hard coat material having high refractive index, it is proposed that a metal oxide and an organosilicon compound (so-called silane coupling agent) are contained in the hard coat material. For example, Japanese Unexamined Patent Application Publication No. 2002-129102 (referred to as "Patent Document 1" hereinafter) discloses a coating composition containing an organosilicon compound (or a hydrolysate thereof) and sol of a composite oxide formed of titanium oxide, tin oxide and zirconium oxide. Such a coating composition has improved surface hardness, scratch resistance and wear resistance.

However, if an antireflection film is formed on the hard coat having high refractive index, impact resistance will decrease. To solve this problem, a technology is disclosed in Japanese Unexamined Patent Application Publication No. H09-136978 (referred to as "Patent Document 2" hereinafter), in which a primer layer is provided between the lens surface and the hard coat layer, so that both the high refractive index and high impact resistance can be achieved by suitably determining the material of the primer layer.

SUMMARY OF THE INVENTION

A hard coat having both high refractive index and high scratch resistance can be obtained by employing the hard coat material containing the metal oxide and the organosilicon compound disclosed in Patent Document 1. However, if increasing the content of the metal oxide in order to improve the scratch resistance, cracks may be generated during polymerization contraction occurred when curing the film by heating.

Further, if simply increasing the film thickness of the hard coat in order to improve the scratch resistance, cracks may also be generated. Further, in the case where the primer layer disclosed in Patent Document 2 is provided in combination, there is a concern that interference color may change. If unevenness in interference color is caused, the product will become unmarketable and therefore manufacturing yield will become low especially in the case where the plastic lens is used as spectacle plastic lenses whose interference color is desired to fall within a specified range.

Further, high refractive index can be achieved when titania (titanium dioxide; chemical formula: $TiO_2$) is used as the metal oxide contained in the hard coat material as described in Patent Document 1. However, in order to improve weather resistance, it is preferred that a rutile titania is used as the metal oxide, and it is more preferred that a rutile titania mixed with zirconia (zirconium dioxide; chemical formula: $ZrO_2$) is used as the metal oxide. In other words, both the high refractive index and excellent weather resistance can be achieved by employing a material containing rutile titania and zirconia.

However, when rutile titania sol and zirconia sol are mixed with each other, aggregation may occur. It is presumed that the aggregation is caused due to pH difference between the respective materials. Thus, it seems possible to adjust pH by, for example, adding amines and the like.

However, if a large amount of amines is added, yellowing will occur, in other words, YI (Yellowness Index, an index describing how yellow a lens is) will increase.

In view of the aforesaid problems, an object of a first aspect of the present invention is to provide a plastic lens and a manufacturing method thereof, wherein scratch resistance and surface hardness can be improved, and cracks will not be caused when forming a hard coat layer having a relatively high refractive index on the plastic lens.

Further, an object of a second aspect of the present invention is to improve scratch resistance when forming a hard coat layer having a relatively high refractive index on the plastic lens through a primer layer.

Further, an object of a third aspect of the present invention is to provide a hard coat material containing titania and zirconia which contribute to increasing refractive index and improve weather resistance, in a manner in which aggregation caused in manufacturing process is inhibited, and further, yellowing generated after the hard coat is formed on the plastic lens is inhibited.

A manufacturing method of plastic lens according to a first aspect of the present invention includes the steps of: preparing a first liquid containing at least one metal oxide and a second liquid containing at least one organosilicon compound; manufacturing a hard coat liquid by mixing the first liquid and the second liquid so that the mass ratio of the solid content of the first liquid to the solid content of second liquid falls within a range of 45/55 to 65/35; and coating the hard coat liquid on a plastic lens substrate to form a hard coat film and then curing the hard coat film.

A plastic lens according to the first aspect of the present invention includes a hard coat layer containing at least one metal oxide and at least one organosilicon compound formed on a lens substrate thereof, wherein the mass ratio of the solid content of the metal oxide to the solid content of the organosilicon compound falls within a range of 45/55 to 65/35.

As described above, according to the plastic lens and the manufacturing method of plastic lens according to the first aspect of the present invention, the mass ratio of the solid content of the metal oxide contained in the hard coat layer to the solid content of the organosilicon compound contained in the hard coat layer falls within a range of 45/55 to 65/35. By selecting the mass ratio of the solid content of the metal oxide to the solid content of the organosilicon compound in a specified range, both the sufficient surface hardness and high scratch resistance can be achieved reliably.

A plastic lens according to a second aspect of the present invention includes: a plastic lens substrate; a primer layer formed on the plastic lens substrate; a hard coat layer formed on the primer layer; and an antireflection film formed on the hard coat layer, wherein the hard coat layer contains a metal oxide and a composition obtained by mixing a material represented by General Formula (1) and a material represented by General Formula (2)

(where "$R^1$" represents a monovalent hydrocarbon group having 1 to 20 carbon atoms with an amino group; "$R^2$" represents an alkyl group having 1 to 8 carbon atoms, an aryl group having 6 to 10 carbon atoms, an aralkyl group having 7 to 10 carbon atoms, or an acyl group having 2 to 10 carbon atoms; n represents integer 1 or integer 2; and when there are a plurality of $R^1$s, the plurality of $R^1$s may either be identical to or different from each other, and the plurality of $OR^2$s may either be identical to or different from each other)

(where "$R^3$" represents a monovalent hydrocarbon group having 1 to 20 carbon atoms with an isocyanate group; "$R^4$" represents an alkyl group having 1 to 8 carbon atoms, an aryl group having 6 to 10 carbon atoms, an aralkyl group having 7 to 10 carbon atoms, or an acyl group having 2 to 10 carbon atoms; n represents integer 1 or integer 2; and when there are a plurality of $R^3$s, the plurality of $R^3$s may either be identical to or different from each other, and the plurality of $OR^4$s may either be identical to or different from each other), and wherein the thickness of the hard coat layer is equal to or greater than two times of the thickness of the primer layer.

Further, a manufacturing method of plastic lens comprising the steps of: forming a primer layer on a plastic lens substrate; preparing a hard coat liquid; forming a film of the hard coat liquid on the primer layer such that after the formed film has been cured, thickness of the hard coat layer is equal to or greater than two times of thickness of the primer layer; curing the film of the hard coat liquid to form a hard coat layer; and forming an antireflection film on the hard coat layer, wherein the hard coat liquid contains a metal oxide and a composition obtained by mixing a material represented by General Formula (1) (symbols and means thereof are the same as described above) and a material represented by General Formula (2) (symbols and means thereof are the same as described above)

As described above, according to the second aspect of the present invention, in the case where the primer layer and the hard coat layer are formed on the plastic lens substrate, the hard coat layer contains a metal oxide and a composition obtained by mixing the material represented by General Formula (1) and the material represented by General Formula (2). Further, by setting the thickness of the hard coat layer to equal to or greater than two times of the thickness of the primer layer, scratch resistance of the hard coat layer can be improved reliably.

A manufacturing method of plastic lens according to a third aspect of the present invention includes the steps of:
(1) preparing a rutile titania sol and a zirconia sol;
(2) adding an aluminum-based catalyst into either one of the rutile titania sol and the zirconia sol;
(3) adding the other one of the rutile titania sol and the zirconia sol into the one of the rutile titania sol and the zirconia sol to which the aluminum-based catalyst has been added;
(4) mixing the material containing the rutile titania sol, the aluminum-based catalyst and the zirconia sol with a material containing one or more organosilicon compounds so as to form a hard coat liquid; and
(5) coating the hard coat liquid on the plastic lens substrate to form a hard coat film and then curing the hard coat film.

A manufacturing method of hard coat liquid according to the third aspect of the present invention includes the steps of:
(1') preparing a rutile titania sol and a zirconia sol;
(2') adding an aluminum-based catalyst into either one of the rutile titania sol and the zirconia sol;
(3') adding the other one of the rutile titania sol and the zirconia sol into the one of the rutile titania sol and the zirconia sol to which the aluminum-based catalyst has been added; and
(4') mixing the material containing the rutile titania sol, the aluminum-based catalyst and the zirconia sol with a material containing one or more organosilicon compounds so as to form a hard coat liquid.

As described above, according to the third aspect of the present invention, when mixing the rutile titania sol and the zirconia sol with each other, an aluminum-based catalyst is previously added into one of the both sols.

In such a manner, by adding the aluminum-based catalyst into either one of the sols before mixing both sols with each other instead of after mixing both sols with each other, pH can be properly adjusted. An aluminum chelate whose Al atom having at least one coordinate bond can be used as the aluminum-based catalyst. Thus, when these materials are mixed with each other, generation of the aggregation can be sufficiently inhibited or even avoided. Further, since addition of amines and the like can be reduce or even avoided, yellowing can be inhibited.

According to the first aspect of the present invention, it is possible to provide a plastic lens and a manufacturing method of plastic lens in which both the high scratch resistance and high surface hardness can be achieved.

According to the second aspect of the present invention, in the case where a hard coat layer having relatively high refractive index is formed on a plastic lens through a primer layer, scratch resistance can be improved.

According to the second aspect of the present invention, it is possible to inhibit aggregation caused during the process of manufacturing a hard coat liquid containing titania and zirconia, and further, it is possible to inhibit yellowing in a state where the hard coat is formed on the plastic lens.

BRIEF DESCRIPTION OF THE DRAWINGS

FIG. 5 is another flowchart showing the manufacturing method of the plastic lens according to the embodiment of the third aspect of the present invention; and FIG. 6 explains results of a scratch test of the plastic lens.

DETAILED DESCRIPTION OF THE PREFERRED EMBODIMENT(S)

Figure 1:
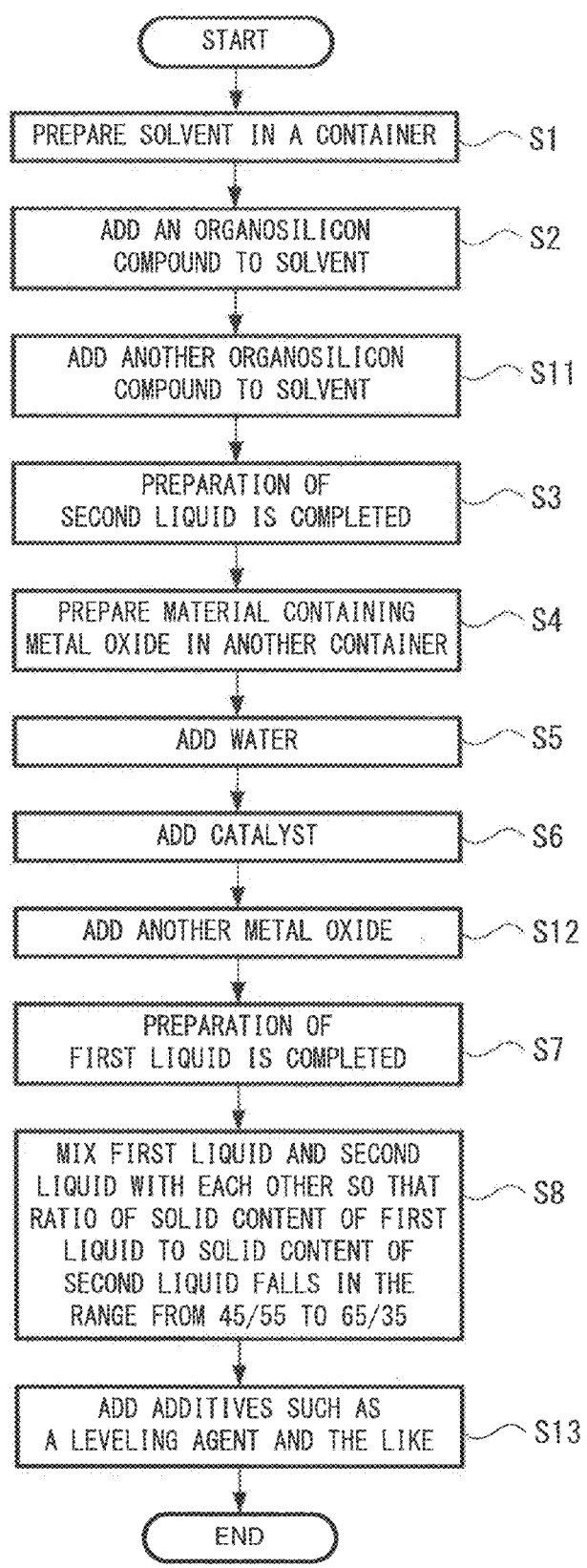
FIG. 1 is a flowchart showing a manufacturing method of a plastic lens according to an embodiment of a first aspect of the present invention.

The present invention includes, but not limited to, the following preferred embodiments. The description is made in the following order.

[1] Material and Manufacturing Method of Plastic Lens and Coating Layer common to First to Third Aspects of the Present Invention
[2] Embodiment of First Aspect of the Present Invention
[3] Embodiment of Second Aspect of the Present Invention
[4] Embodiment of Third Aspect of the Present Invention
[5] Examples
  (1) Examples of First Aspect of the Present Invention
  (2) Examples of Second Aspect of the Present Invention
  (3) Examples of Third Aspect of the Present Invention

[1] Material and Manufacturing Method of Plastic Lens and Coating Layer common to First to Third Aspects of the Present Invention The plastic lenses according to the present invention includes a plastic lens substrate, a hard coat layer formed on the lens substrate through a primer layer (which is provided for improving adhesion and impact resistance), and at least an antireflection film formed on the hard coat layer.

Examples of the material of the lens substrate for the plastic lens include, for example, methyl methacrylate homopolymers, copolymers of methyl methacrylate and at least one other monomer, diethylene glycol bisallylcarbonate homopolymers, copolymers of diethylene glycol bisallylcarbonate and at least one other monomer, sulfur-containing copolymers, halogen-containing copolymers, polycarbonates, polystyrenes, polyvinyl chlorides, unsaturated polyesters, polyethylene terephthalates, polyurethanes, polythiourethanes, homopolymers of a monomer having a sulfide bond, copolymers of sulfide and at least one other monomer, copolymers of polysulfide and at least one other monomer, and polydisulfide and at least one other monomer.

The present invention can be preferably applied to the case where the lens substrate for making the lens is made of a material having relatively a high refractive index of 1.6 or more.

In the case where a primer layer is provided between the lens substrate and the hard coat layer, the primer layer may be formed of a material having good adhesion to both the lens substrate and hard coat layer, capable of improve impact resistance, and further, not adversely affecting optical characteristics in the case where the lens substrate is formed of a material having relatively high refractive index. For example, the primer layer may be formed of a material containing polyol, polyisocyanate, a blocking agent for NCO group of polyisocyanate. The primer layer may further contain metal oxide(s).

Examples of polyol include polycarbonate polyol, polyether polyol, acrylic polyol, polyester polyol and the like. Examples of polycarbonate polyol include Nippollan 980 (trade name, manufactured by Nippon Polyurethane Co., Ltd.), Carbodiol (trade name, manufactured by TOAGOSEI Co., Ltd.) and the like; Examples of polyether polyol include ADEKA POLYETHER (trade name, manufactured by ADEKA Corporation), Actocall PPG-DiolSeries (trade name, manufactured by Mitsui Chemicals Polyurethanes, Inc.) and the like; Examples of acrylic polyol include TAKELAC (trade name, manufactured by Mitsui Chemicals Polyurethanes, Inc.), ACLYDIC (trade name, manufactured by DIC Inc. (old name: Dainippon Ink & Chemicals Inc.)) and the like; Examples of polyester polyol include Polylight (trade name, manufactured by DIC Inc.), Kuraray Polyol series (trade name, manufactured by Kuraray Co., Ltd.) and the like.

Examples of polyisocyanate include: polyisocyanate or modified materials thereof, isocyanurate, allophanate, biuret, carbodiimide, or aducts such as trimers thereof, wherein examples of polyisocyanate include hexamethylene diisocyanate, 1,3,3-trimethyl hexamethylene diisocyanate, isophorone diisocyanate, 4,4'-dicyclohexylmethane diisocyanate, xylylene diisocyanate, tetramethyl xylylene diisocyanate, hydrogenated xylylene diisocyanate, tolylene diisocyanate, diphenylmethane diisocyanate, hydrogenated diphenylmethane diisocyanate, 1,5-naphthalene diisocyanate, tetramethyl xylylene diisocyanate and the like.

Examples of the blocking agent for NCO group of polyisocyanate include: β-diketone, methyl ethyl ketoxime, acetylacetone, 2,4-hexanedione, 3,5-heptanedione, acetoxime, methyl ethyl ketoxime, caprolactam and the like, wherein β-diketone, methyl ethyl ketoxime are preferred to be used.

Further, metal oxide may be added into the primer composition in order to increase the refractive index. Examples of the metal oxide include oxide of at least one metal selected from the group consisting of Si, Al, Sn, Sb, Ta, Ce, La, Fe, Zn, W, Zr, In and Ti, or a sol containing particulates of these metal oxides.

Particularly, when the primer layer is formed of a material obtained by mixing a urethane resin and a rutile titania sol, good adhesion and relatively high refractive index can be achieved, and further, since the photoactivity of the rutile crystal $TiO_2$ is suppressed, reduction in weather resistance can be suppressed.

Further, in the case where the primer layer is formed of a material containing a zirconia sol, reduction in weather resistance can be further suppressed.

Glycols or the like can be used as the solvent. Examples of the glycols include ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, ethylene glycol dimethyl ether, ethylene glycol diethyl ether, ethylene glycol dipropyl ether, ethylene glycol dibutyl ether, diethylene glycol dimethyl ether, diethylene glycol diethyl ether, diethylene glycol dipropyl ether, diethylene glycol dibutyl ether, propylene glycol dimethyl ether, propylene glycol diethyl ether, and the like.

Other materials can be contained in the primer layer material include a leveling agent such as a copolymer of polyoxyalkylene and polydimethylsiloxane, and a copolymer of polyoxyalkylene and fluorocarbon.

The primer layer can be formed by coating the primer material using a film forming method such as dipping, spin coating or the like, and then curing the coated material by heating or light irradiation.

Further, examples of the metal oxide contained in the hard coat layer of the present invention include oxide and/or composite oxide of at least one metal selected from the group consisting of Al, Ti, Sb, Zr, Si, Ce, Fe, In and Sn. Particularly, when $TiO_2$, $ZrO_2$, $CeO_2$, $ZnO_2$, $SnO_2$ and/or ITO (indium-tin composite oxide) are used as the metal oxide, the refractive index of the entire hard coat layer can be relatively increased, and therefore the hard coat containing such metal oxide can be preferably applied to a lens substrate having high refractive index.

Examples of the solvent for dispersing the metal oxide include known materials such as alcohols, glycol ethers, glycols, ketones and the like. Examples of alcohols include methanol, ethanol, isopropanol and the like. Examples of glycol ethers include propylene glycol monomethyl ether, propylene glycol monoethyl ether, propylene glycol monobutyl ether, propylene glycol propyl ether, ethylene glycol monomethyl ether, ethylene glycol monoethyl ether, ethylene glycol monobutyl ether and the like. Examples of glycols include ethylene glycol, diethylene glycol, triethylene glycol, propylene glycol and the like. Examples of ketones include methyl ethyl ketone, methyl isobutyl ketone and the like.

Further, it is preferred that the organosilicon compound contained in the hard coat liquid of the present invention includes at least one silane coupling agent selected from the group consisting of amino-based, isocyanate-based, epoxy-based, acrylic-based, vinyl-based, methacrylic-based, styryl-based, ureido-based, mercapto-based silane coupling agents. The aforesaid silane coupling agents may be at least one organosilicon compound represented by General Formula (3), organosilicon compound represented by General Formula (4), hydrolysates thereof, and/or the like, for example.

$$(R^5)_n Si(OR^6)_{4-n} \quad (3)$$

In General Formula (3), "$R^5$" represents a monovalent hydrocarbon group having 3 to 20 carbon atoms with a functional group (amino group, isocyanate group, epoxy group, acrylic group, vinyl group, methacrylic group, styryl group, ureido group, mercapto group), and examples of $R^5$ include: γ-aminopropyl group, N-β(aminoethyl)-γ-aminopropyl group, N-phenyl-γ-aminopropyl group, γ-isocyanatopropyl group, γ-glycidoxypropyl group, β-epoxycyclohexylethyl group, γ-acryloxypropyl group, vinyl group, γ-methacryloxypropyl group, p-styryl group, γ-ureidopropyl group, γ-mercaptopropyl group, and the like.

Further, in General Formula (3), "$R^6$" represents an alkyl group having 1 to 8 carbon atoms, an aryl group having 6 to 10 carbon atoms, an aralkyl group having 7 to 10 carbon atoms, or an acyl group having 2 to 10 carbon atoms.

The alkyl group having 1 to 8 carbon atoms may be linear, branched or cyclic. Examples of the alkyl group include methyl group, ethyl group, n-propyl group, isopropyl group, n-butyl group, isobutyl group, sec-butyl group, tert-butyl group, pentyl group, hexyl group, octyl group, cyclopentyl group and cyclohexyl group and the like. Examples of the aryl group having 6 to 10 carbon atoms include phenyl group, tolyl group and the like. Examples of the aralkyl group having 7 to 10 carbon atoms include benzyl group, phenethyl group and the like. Examples of the acyl group having 2 to 10 carbon atoms include acetyl group and the like.

In General Formula (3), n represents integer 1 or integer 2. When there are a plurality of $R^5$s, the plurality of $R^5$s may either be identical to or different from each other, and the plurality of $OR^6$s may either be identical to or different from each other.

Concrete examples of the organosilicon compound represented by General Formula (3) include γ-aminopropyl trimethoxysilane, γ-aminopropyl dimethoxymethylsilane, γ-aminopropyl triethoxysilane, γ-aminopropyl diethoxymethylsilane, N-β-(aminoethyl)-γ-aminopropyl dimethoxymethylsilane, N-β-(aminoethyl)-γ-aminopropyl trimethoxysilane, N-β-(aminoethyl)-γ-aminopropyl triethoxysilane, N-β-(aminoethyl)-γ-aminopropyl diethoxymethylsilane, N-phenyl-γ-aminopropyl trimethoxysilane, N-phenyl-γ-aminopropyl dimethoxymethylsilane, N-phenyl-γ-aminopropyl triethoxysilane, N-phenyl-γ-aminopropyl diethoxymethylsilane, γ-isocyanatopropyl trimethoxysilane, γ-isocyanatopropyl dimethoxymethylsilane, γ-isocyanatopropyl triethoxysilane, γ-isocyanatopropyl diethoxymethylsilane, γ-glycidoxypropyl trimethoxysilane, γ-glycidoxypropyl dimethoxymethylsilane, γ-glycidoxypropyl triethoxysilane, γ-glycidoxypropyl diethoxymethylsilane, β-epoxycyclohexylethyl trimethoxysilane, β-epoxycyclohexylethyl dimethoxymethylsilane, β-epoxycyclohexylethyl triethoxysilane, β-epoxycyclohexylethyl diethoxymethylsilane, γ-acryloxypropyl trimethoxysilane, γ-acryloxypropyl dimethoxymethylsilane, γ-acryloxypropyl triethoxysilane, γ-acryloxypropyl diethoxymethylsilane, vinyl trimethoxysilane, vinyl dimethoxymethylsilane, vinyl triethoxysilane, vinyl diethoxymethylsilane, γ-methacryloxypropyl trimethoxysilane, γ-methacryloxypropyl dimethoxymethylsilane, γ-methacryloxypropyl triethoxysilane, γ-methacryloxypropyl diethoxymethylsilane, p-styryl trimethoxysilane, p-styryl dimethoxymethylsilane, p-styryl triethoxysilane, p-styryl diethoxymethylsilane, γ-ureidopropyl trimethoxysilane, γ-ureidopropyl dimethoxymethylsilane, γ-ureidopropyl triethoxysilane, γ-ureidopropyl diethoxymethylsilane, γ-mercaptopropyl trimethoxysilane, γ-mercaptopropyl dimethoxymethylsilane, γ-mercaptopropyl triethoxysilane, γ-mercaptopropyl diethoxymethylsilane and the like.

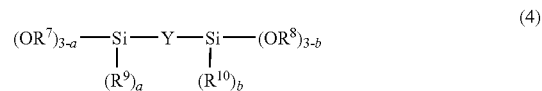

$$(OR^7)_{3-a} - \underset{(R^9)_a}{Si} - Y - \underset{(R^{10})_b}{Si} - (OR^8)_{3-b} \quad (4)$$

In General Formula (4), $R^7$ and $R^8$ are each an alkyl group having 1 to 4 carbon atoms or an acyl group having 2 to 4 carbon atoms, and $R^7$ and $R^8$ may either be identical to or different from each other. Further, in General Formula (4), $R^9$ and $R^{10}$ are each a monovalent hydrocarbon group having 1 to 5 carbon atoms with or without a functional group, and $R^9$ and $R^{10}$ may either be identical to or different from each other.

Examples of the alkyl group having 1 to 4 carbon atoms of $R^7$ and $R^8$ include methyl group, ethyl group, n-propyl group, isopropyl group, n-butyl group, isobutyl group, sec-butyl group, tert-butyl group and the like. Examples of the acyl group having 2 to 4 carbon atoms of $R^7$ and $R^8$ include acetyl group and the like.

Examples of the hydrocarbon group of $R^9$ and $R^{10}$ include an alkyl group having 1 to 5 carbon atoms, an alkenyl group having 2 to 5 carbon atoms and the like. The hydrocarbon group and alkenyl group may be linear or branched. Examples of the alkyl group include methyl group, ethyl group, n-propyl group, isopropyl group, n-butyl group, sec-butyl group, tert-butyl group, pentyl group and the like. Examples of the alkenyl group include vinyl group, allyl group, butenyl group and the like.

Examples of the functional group of the hydrocarbon group include, for example, halogen atom, glycidoxy group, epoxy group, amino group, mercapto group, cyano group, (meth) acryloyloxy group and the like.

In General Formula (4), "Y" is a bivalent hydrocarbon group having 2 to 20 carbon atoms, and preferably is an alkylene group or alkylidene group having 2 to 10 carbon atoms. Examples of the hydrocarbon group include, for example, methylene group, ethylene group, propylene group, butylene group, ethylidene group, propylidene group, and the like.

In General Formula (4), "a" and "b" each represent integer 0 or integer 1. The plurality of $OR^7$s may either be identical to or different from each other, and the plurality of $OR^8$s may either be identical to or different from each other.

Concrete examples of the organosilicon compound represented by General Formula (4) include bis(triethoxysilyl)ethane, bis(trimethoxysilyl)ethane, bis(triethoxysilyl)methane, bis(trimethoxysilyl)hexane, bis(triethoxysilyl)octane and the like, wherein bis(triethoxysilyl)ethan and bis(trimethoxysilyl)ethane are preferred.

It is preferred that, in the materials described above, the organosilicon compound contained in the hard coat liquid of the plastic lens according to the present invention includes at least one silane coupling agent selected from the group consisting of epoxy-based, acrylic-based, vinyl-based, methacryl-based silane coupling agents.

Further, it is preferred that the other organosilicon compound contained in the hard coat liquid include at least one silane coupling agent selected from the group consisting of amino-based, isocyanate-based silane coupling agents.

It is preferred that at least one compound selected from the group consisting of organosilicon compound having an amino group represented by General Formula (1) and hydrolysates thereof is used as the aforesaid compounds.

$$(R^1)_n Si(OR^2)_{4-n} \quad (1)$$

In General Formula (1), "$R^1$" represents a monovalent hydrocarbon group having 1 to 20 carbon atoms with an amino group. Examples of $R^1$ include γ-aminopropyl group, N-β-(aminoethyl)-γ-aminopropyl group, N-phenyl-γ-aminopropyl group and the like.

Further, in General Formula (1), "$R^2$" represents an alkyl group having 1 to 8 carbon atoms, an aryl group having 6 to 10 carbon atoms, an aralkyl group having 7 to 10 carbon atoms, or an acyl group having 2 to 10 carbon atoms. Examples of $R^2$ are identical to those of the aforesaid $R^6$.

Further, in General Formula (1), n represents integer 1 or integer 2. When there are a plurality of R's, the plurality of R's may either be identical to or different from each other, and the plurality of $OR^2$s may either be identical to or different from each other.

Concrete examples of the organosilicon compound represented by General Formula (1) include amino-based silane coupling agents such as γ-aminopropyl trimethoxysilane, γ-aminopropyl dimethoxymethylsilane, γ-aminopropyl triethoxysilane, γ-aminopropyl diethoxymethylsilane, N-β-(aminoethyl)-γ-aminopropyl dimethoxymethylsilane, N-β-(aminoethyl)-γ-aminopropyl trimethoxysilane, N-β-(aminoethyl)-γ-aminopropyl triethoxysilane, N-β-(aminoethyl)-γ-aminopropyl diethoxymethylsilane, N-phenyl-γ-aminopropyl trimethoxysilane, N-phenyl-γ-aminopropyl dimethoxymethylsilane, N-phenyl-γ-aminopropyl triethoxysilane, N-phenyl-γ-aminopropyl diethoxymethylsilane and the like.

Among the aforesaid amino-based silane coupling agents, γ-aminopropyl trimethoxysilane, γ-aminopropyl triethoxysilane, γ-aminopropyl dimethoxymethylsilane and γ-aminopropyl diethoxymethylsilane are preferred to be used, and γ-aminopropyl trimethoxysilane, γ-aminopropyl triethoxysilane and γ-aminopropyltrialkoxysilane are more preferred to be used.

Other organosilicon compounds can be used include at least one compound selected from the group consisting of organosilicon compounds having an isocyanate group represented by General Formula (2), and hydrolysates thereof.

$$(R^3)_n Si(OR^4)_{4-n} \quad (2)$$

In General Formula (2), "$R^3$" represents a monovalent hydrocarbon group having 1 to 20 carbon atoms with an isocyanate group. Examples of $R^3$ include isocyanatomethyl group, α-isocyanatoethyl group, β-isocyanatoethyl group, α-isocyanatopropyl group, β-isocyanatopropyl group, γ-isocyanatopropyl group and the like.

Further, in General Formula (2), "$R^4$" represents an alkyl group having 1 to 8 carbon atoms, an aryl group having 6 to 10 carbon atoms, an aralkyl group having 7 to 10 carbon atoms, or an acyl group having 2 to 10 carbon atoms. Examples of $R^2$ are identical to those of the aforesaid $R^6$.

Further, in General Formula (2), n represents integer 1 or integer 2. When there are a plurality of $R^3$s, the plurality of $R^3$s may either be identical to or different from each other, and the plurality of $OR^4$s may either be identical to or different from each other.

Examples of the compound represented by General Formula (2) include isocyanate-based silane coupling agents such as γ-isocyanatopropyl trimethoxysilane, γ-isocyanatopropyl dimethoxymethylsilane, γ-isocyanatopropyl triethoxysilane, γ-isocyanatopropyl diethoxymethylsilane, wherein γ-isocyanatopropyl trimethoxysilane, γ-isocyanatopropyl triethoxysilane, γ-isocyanatopropyltrialkoxysilane are preferred.

Further, it is preferred that the following compounds are used as the solvent for dissolving the organosilicon compound: methanol, ethanol, isopropanol, propylene glycol monomethyl ether, propylene glycol monoethyl ether, propylene glycolmonobutyl ether, propylene glycol propyl ether, ethylene glycol monomethyl ether, ethylene glycol monoethyl ether, ethylene glycolmonobutyl ether, ethylene glycol, diethylene glycol, triethylene glycol, propylene glycol, diacetone alcohol, tetrahydrofuran, methyl ethyl ketone, methyl isobutyl ketone, toluene, ethyl acetate, propylene glycol monomethyl ether acetate, propylene glycol monoethyl ether acetate and the like.

Further, the hard coat liquid may include a curing catalyst and various kinds of organic solvents and surfactants. The curing catalyst is provided for promoting the pertaining reaction, and the various kinds of organic solvents and surfactants are provided for improving wettability and smoothness when coating the hard coat liquid on the lens substrate. Further, ultraviolet absorber, antioxidant, photo-stabilizer and the like may also be added to the hard coat liquid as long as the properties of the hard coat layer are not adversely affected.

The curing catalyst is not particularly specified. Examples the curing catalyst include amines such as allylamine, ethylamine and the like; various kinds of acids and bases such as salts or metallic salts of organic carboxylic acid, chromic acid, hypochlorous acid, boric acid, perchloric acid, bromic acid, selenious acid, thiosulfuric acid, orthosilicic acid, thiocyanic acid, nitrous acid, aluminic acid, carbonic acid and the like; alkoxides or chelates of aluminum, zirconium and titanium.

The most preferred curing catalyst among the curing catalysts cited above is aluminum chelate (which is an aluminum-based catalyst). Examples of aluminum chelate include ethyl acetoacetate aluminum diisopropylate, aluminum tris(ethyl acetoacetate), alkyl acetoacetate aluminum diisopropylate, aluminum monoacetylacetonate bis(ethyl acetoacetate), aluminum tris(acetylacetonate), monoisopropoxy monooleoxy ethyl acetoacetate and the like. When such an aluminum-based catalyst (particularly aluminum chelate) is used as the curing catalyst, since the aluminum-based catalyst has pH adjusting function, in the case where a plurality of materials containing metal oxide are to be added, aggregation caused due to pH difference between the plurality of materials can be inhibited.

The hard coat liquid prepared in the aforesaid manner is coated on the lens substrate by dipping, spin coating, spraying or the like to form a film, and then the formed film is cured by heating or light irradiation, so that a hard coat layer is formed on the lens substrate.

[2] Embodiment of First Aspect of the Present Invention

The manufacturing method of the plastic lens according to an embodiment of a first aspect of the present invention will be described below with reference to FIG. 1. According to the embodiment of the first aspect of the present invention, the hard coat liquid for forming the hard coat layer is prepared by mixing a first liquid containing at least one metal oxide and a second liquid containing at least one organosilicon compound with each other. Examples of the metal oxide contained in the first liquid include oxide and/or composite oxide of at least one metal selected from the group consisting of Al, Ti, Sb, Zr, Si, Ce, Fe, In and Sn. Particularly, when $TiO_2$, $ZrO_2$, $CeO_2$, $ZnO_2$, $SnO_2$ and/or ITO (indium-tin composite oxide) are used as the metal oxide, the refractive index of the entire hard coat layer can be relatively increased, and therefore the hard coat containing such metal oxide can be preferably applied to a lens substrate having high refractive index. The present embodiment is described using an example in which the hard coat liquid is prepared by mixing a first liquid containing two metal oxides and a second liquid containing three organosilicon compounds with each other.

First, as shown in FIG. 1, a solvent is prepared in a first container (Step S1). Next, an organosilicon compound is added to the solvent in the first container (Step S2). Further, in the case where two organosilicon compounds are to be used, another organosilicon compound is added to the result of Step S10 (Step S11). Note that Step S11 shall be skipped if only one organosilicon compound is used. Further, in the case where three or more organosilicon compounds are to be used, step(s) of adding further another organosilicon compound(s) shall be added. In the case where only one organosilicon compound is used, the preparation of the second liquid is completed at a point when the organosilicon compound is dissolved in the solvent, and in the case where a plurality of organosilicon compounds are used, the preparation of the second liquid is completed at a point when the plurality of organosilicon compounds are dissolved in the solvent and pertaining chemical reaction of the plurality of organosilicon compounds is completed (Step S3).

Next, a material containing a metal oxide is prepared in a second container (Step S4). The material containing the metal oxide may be, for example, a sol-like material obtained by dispersing particulate metal oxide into a solvent. Next, distilled water is added (Step S5). By adding the distilled water, pH can be buffered when the material containing the metal oxide is not neutral.

Next, a catalyst for improving curing and the like is added (Step S6). Further, in the case where two or more metal oxides are to be added, a material containing a second metal oxide is added after the catalyst has been added, for example (Step S12). Note that Step S12 shall be skipped if only one metal oxide is used. The material containing the second metal oxide may also be, for example, a sol-like material obtained by dispersing particulate metal oxide into a solvent.

In the case where two or more different materials containing metal oxide are to be added, due to pH difference between these materials, there is a concern that aggregation may be generated when these materials are mixed with each other. In order to inhibit generation of the aggregation, a catalyst may be previously added before the material containing the second metal oxide is added as shown in FIG. 1. This is because, if a material having pH adjusting function (such as the aforesaid aluminum chelate and the like) is used as the catalyst, generation of the aggregation can be inhibited or even avoided. Note that, other materials having pH adjusting function may also be used instead of the aluminum chelate. Further, in addition to the catalyst, other materials having pH adjusting function may also be added before or after the catalyst is added.

With the aforesaid steps, preparation of first liquid is completed (Step S7).

Thereafter, the first liquid and the second liquid are mixed with each other. At this time, the second liquid is added into the first liquid so that mixing ratio (i.e., mass ratio) of the solid content of the first liquid to the solid content of the second liquid falls within a range from 45/55 to 65/35 (Step S8).

Further, additives such as a leveling agent and the like are added according to necessity in order to improve smoothness and equalize the film thickness (Step S13). Note that Step S13 can be skipped if the aforesaid additives are not necessary.

With the aforesaid steps, the preparation of the hard coat liquid (the material of the hard coat layer) is completed.

Note that, although the process of adding the organosilicon compounds to prepare the second liquid is performed first in the present embodiment described with reference to the flowchart of FIG. 1, the process of adding the metal oxides to prepare the first liquid may be performed first, or the both processes may be performed at the same time.

[3] Embodiment of Second Aspect of the Present Invention

The manufacturing method of the plastic lens according to an embodiment of a second aspect of the present invention will be described below with reference to FIG. 2. In the embodiment of the second aspect of the present invention, a hard coat liquid for forming the hard coat layer contains a composition obtained by mixing the materials represented by General Formulas (1) and (2).

Figure 2:
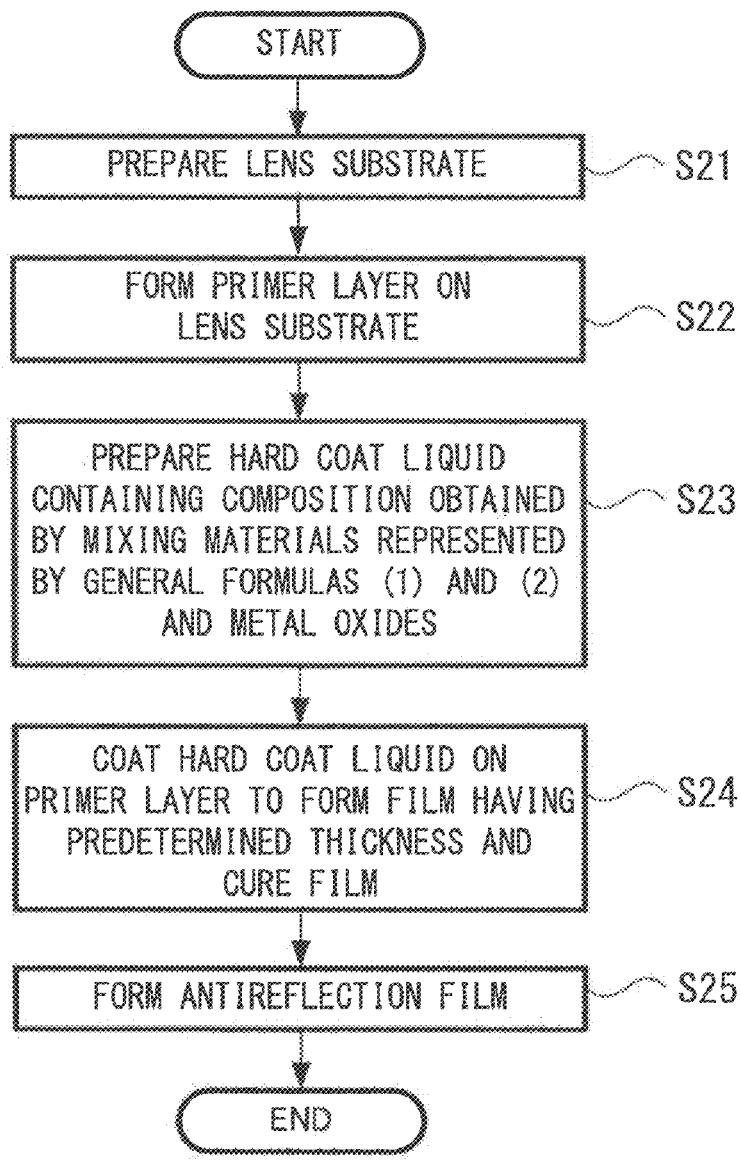
FIG. 2 is a flowchart showing a manufacturing method of a plastic lens according to an embodiment of a second aspect of the present invention.

First, as shown in FIG. 2, a lens substrate is prepared (Step S21). Next, a primer layer formed of the aforesaid materials is formed on the lens substrate (Step S22). Further, the hard coat liquid is prepared (Step S23). The hard coat liquid contains a composition obtained by mixing the materials represented by General Formulas (1) and (2), other organosilicon compound(s) (according to necessity), and metal oxide(s) with each other. The details about the process of preparing the hard coat liquid will be described later. Further, the prepared hard coat liquid is coated on the primer layer to form a film, and then the formed film is cured. The formed film of the hard coat liquid has a predetermined thickness such that after the formed film has been cured, the thickness of the hard coat layer is 2 to 10 times of the thickness of the primer layer (Step S24). The film of the hard coat liquid can be formed using a film forming method such as dipping, spin coating, spraying or the like, and the formed film of the hard coat liquid can be cured using a curing method such as heating, light irradiation or the like. Next, an antireflection film is formed on the hard coat layer, and thereby manufacture of the plastic lens is completed (Step S25).

Figure 3:
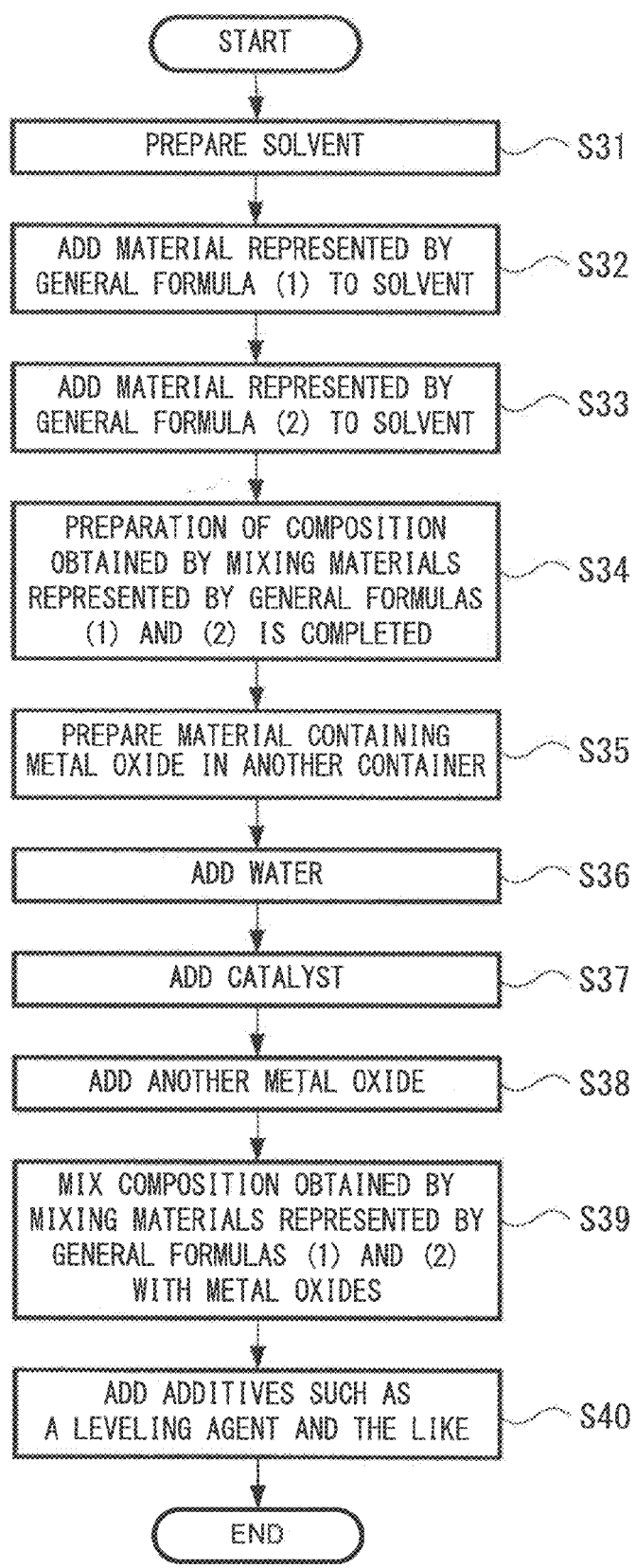
FIG. 3 is another flowchart showing the manufacturing method of the plastic lens according to the embodiment of the second aspect of the present invention.

The process of preparing the hard coat liquid will be described below with reference to FIG. 3. First, as shown in FIG. 3, a solvent is prepared (Step S31). Next, a material represented by General Formula (1) is added to the solvent (Step S32). Next, a material represented by General Formula (2) is added to the result of Step S32 (Step S33). In the case where another organosilicon compound, such as the material represented by General Formula (3) or (4), is to be added, an additional step (not shown) of adding the material shall be added after Step S33. The result of Step S32 is stirred until pertaining chemical reaction of the materials added to the solvent is completed, and thereby preparation of the composition obtained by mixing the materials represented by General Formulas (1) and (2) with each other is completed (Step S34). Such a composition includes urea bond, and has function of improving adhesion to the primer layer.

Next, a material containing a metal oxide is prepared in another container (Step S35). The material containing the metal oxide may be, for example, a sol-like material obtained by dispersing particulate metal oxide into a solvent. Distilled water is added to the material prepared in Step S35 (Step S36). By adding the distilled water, pH can be buffered when the material containing the metal oxide is not neutral.

Next, catalyst for improving curing and the like is added (Step S37). Further, in the case where two or more metal oxides are to be added, a material containing a second metal oxide is added after the catalyst has been added, for example (Step S38). Note that Step S38 shall be skipped if only one metal oxide is used. The material containing a second metal oxide may also be, for example, a sol-like material obtained by dispersing particulate metal oxide into a solvent.

In the case where two or more different materials containing metal oxide are to be added, due to pH difference between these materials, there is a concern that aggregation may be generated when these materials are mixed with each other. In order to inhibit generation of the aggregation, a catalyst may be previously added before the material containing the second metal oxide is added as shown in FIG. 3. This is because, when a material having pH adjusting function (such as the aforesaid aluminum chelate and the like) is used as the catalyst, generation of the aggregation can be inhibited or even avoided. Note that, other materials having pH adjusting function may also be used instead of the aluminum chelate. Further, in addition to the catalyst, other materials having pH adjusting function may also be added before or after the catalyst is added.

Thereafter, the composition obtained by mixing the materials represented by General Formulas (1) and (2) is mixed with the metal oxides (Step S39).

Further, additives such as a leveling agent and the like are added according to necessity in order to improve smoothness and equalize the film thickness (Step S40). Note that Step S40 can be skipped if the aforesaid additives are not necessary.

With the aforesaid steps, the preparation of the hard coat liquid (the material of the hard coat layer) is completed.

Note that, although the process of preparing the composition by mixing materials represented by General Formulas (1) and (2) is performed first in the present embodiment described with reference to the flowchart of FIG. 3, the process of preparing the material containing the metal oxides may be performed first, or the both processes may be performed at the same time.

[4] Embodiment of Third Aspect of the Present Invention

Next, the manufacturing method of the plastic lens according to an embodiment of a third aspect of the present invention will be described below. In the manufacturing method of the plastic lens according to present embodiment, the hard coat liquid for forming the hard coat layer is prepared by mixing a rutile titania sol and a zirconia sol with each other.

Note that, in addition to these metal oxides, other metal oxides may also be added, such as oxides or composite oxide of at least one metal selected from the group consisting of Al, Sb, Si, Ce, Fe, In and Sn. Particularly, when $CeO_2$, $ZnO_2$, $SnO_2$ and/or ITO (indium-tin composite oxide) are added, the refractive index of the entire hard coat layer can be relatively increased, and therefore the hard coat containing such metal oxide can be preferably applied to a lens substrate having high refractive index.

Known materials such as alcohols, glycol ethers, glycols, ketones and the like can be used as the solvent for dispersing the metal oxide. Examples of alcohols include methanol, ethanol, isopropanol and the like. Examples of glycol ethers include propylene glycol monomethyl ether, propylene glycol monoethyl ether, propylene glycol monobutyl ether, propylene glycol propyl ether, ethylene glycol monomethyl ether, ethylene glycol monoethyl ether, ethylene glycol monobutyl ether and the like. Examples of glycols include ethylene glycol, diethylene glycol, triethylene glycol, propylene glycol and the like. Examples of ketones include methyl ethyl ketone, methyl isobutyl ketone and the like.

According to the third aspect of the present invention, before the rutile titania sol and the zirconia sol is mixed with each other, an aluminum-based catalyst is added to either one of the rutile titania sol and the zirconia sol. It is particularly preferred that aluminum chelate is used as the aluminum-based catalyst. Examples of the aluminum chelate include ethyl acetoacetate aluminum diisopropylate (represented by Formula 2), aluminum tris(ethyl acetoacetate) (represented by Formula 3), alkyl acetoacetate aluminum diisopropylate (represented by Formula (4)), aluminum monoacetylacetonate bis(ethyl acetoacetate) (represented by Formula 5), aluminum tris(acetylacetonate) (represented by Formula 6), aluminium=monoisopropoxy monooleoxy ethyl acetoacetate (represented by Formula 7) and the like. When the aluminum-based catalyst (particularly aluminum chelate) is used, since the aluminum-based catalyst has pH adjusting function, generation of aggregation caused due to pH difference between the rutile titania sol and the zirconia sol can be inhibited.

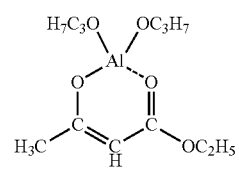

[Formula 2]

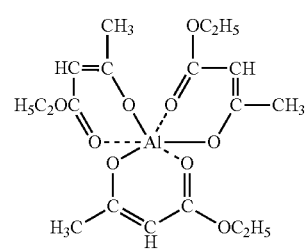

[Formula 3]

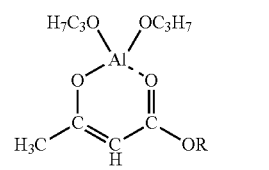

[Formula 4]

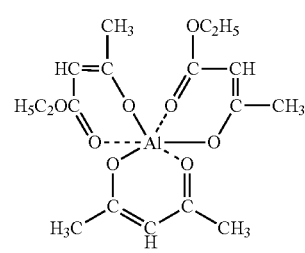

[Formula 5]

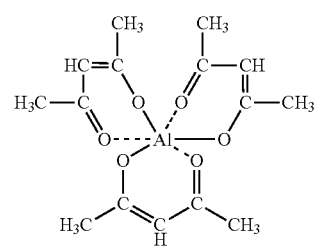

[Formula 6]

-continued

[Formula 7]

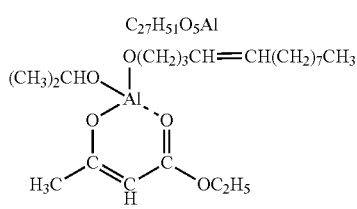

Manufacturing method of the plastic lens according to the present embodiment will be described below with reference to FIG. 4. In the present embodiment, the hard coat liquid is prepared by mixing a material containing organosilicon compound(s) with two metal oxides (the rutile titania sol and the zirconia sol).

Figure 4:
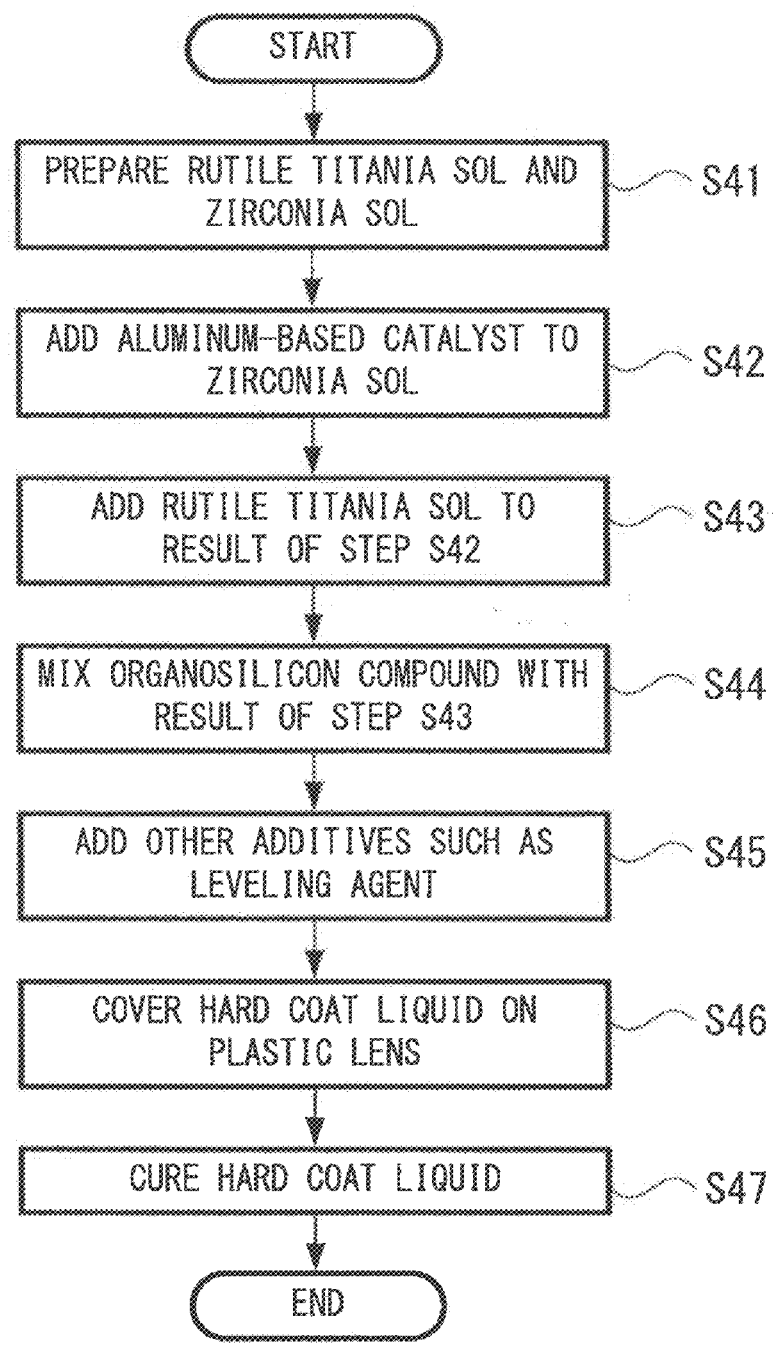
FIG. 4 is a flowchart showing a manufacturing method of a plastic lens according to an embodiment of a third aspect of the present invention.

First, as shown in FIG. 4, the rutile titania sol and the zirconia sol are respectively prepared in different containers (Step S41). Next, the aluminum-based catalyst is added to one sol (the zirconia sol in this case) (Step S42). Next, the other sol (the rutile titania sol in this case) is further added to the result of Step S42 (Step S43). An organosilicon compound prepared in another container is mixed with the result of Step S43 (Step S44). Further, in the case where a plurality of organosilicon compounds are to be mixed into, the organosilicon compounds can be added in several batches. Further, the plurality of organosilicon compounds may also be added after being previously mixed with each other in another container. Further, other additives such as a leveling agent are added (Step S45), and thereby preparation of the hard coat liquid is completed.

Next, a plastic lens substrate formed by molding or the like is separately prepared (the plastic lens substrate has been subjected to surface treatments such as cleaning previously), and the hard coat liquid is covered on the surface of the plastic lens substrate by means of coating, immersing or the like (Step S46). Note that, in the case where a primer layer is to be provided between the lens and the hard coat layer in order to improve adhesion and impact resistance, the hard coat liquid shall be covered after the primer layer is covered on the surface of the lens substrate. Thereafter, the hard coat liquid is cured by heating, ultraviolet light irradiation or the like (Step S47). Thereafter, although not shown in FIG. 4, an antireflection film is further formed on the hard coat layer, and thereby manufacture of the plastic lens is completed.

Note that, the rutile titania sol, the zirconia sol and the aluminum-based catalyst do not have to be mixed in the order shown in FIG. 4, but can be mixed in the order shown in FIG. 5, i.e., the aluminum-based catalyst is added to the rutile titania sol, and then the zirconia sol is added. In the example shown in FIG. 5, the rutile titania sol and the zirconia sol are prepared first (Step S51). Next, the aluminum-based catalyst is added to the rutile titania sol (Step S52). Thereafter, the zirconia sol is added to the result of Step S52 (Step S53). The organosilicon compound(s) prepared separately is mixed with the result of Step S53 (Step S54). Further, additives such as a leveling agent are added (Step S55), and thereby preparation of the hard coat liquid is completed. Thereafter, the hard coat liquid is covered on the surface of a separately prepared plastic lens substrate (Step S56), and then the hard coat liquid covered on the lens substrate is cured (Step S57). Thereafter, although not shown in FIG. 5, an antireflection film is further formed on the hard coat layer, and thereby manufacture of the plastic lens is completed.

[5] Examples (1) Examples of First Aspect of the Present Invention

Next, for describing examples of the first aspect of the present invention, an experimental example was given first in which mixing ratio of the solid content of the first liquid to the solid content of the second liquid was changed to obtain various different hard coat liquids having different mass ratios, and evaluation for evaluating film hardness of the hard coat layer and evaluation for evaluating cracks occurring in the hard coat layer were performed on each of the hard coat liquids. The examples are described below.

In the following example, a hard coat liquid containing two metal oxides and two or more organosilicon compounds was prepared, the hard coat liquid being suitable to form a general hard coat layer on a lens substrate having high refractive index.

First, as a solvent for the organosilicon compounds, 30 parts by mass of DAA (diacetone alcohol) was prepared in a first container at room temperature. First, 4 parts by mass of γ-APS (γ-aminopropyl trimethoxysilane, trade name of A-1110, manufactured by Momentive Performance Materials Japan LLC) was added as a first organosilicon compound, and stirring was started. Thereafter, 5 parts by mass of γ-IPS (γ-isocyanatopropyl trimethoxysilane, trade name, Y-5187, manufactured by Momentive Performance Materials Japan LLC) was added as another organosilicon compound, and stirring was continued. After stirring had continued for several hours so that reaction of these materials was completed, 70 parts by mass of γ-GPS (γ-glycidoxypropyl trimethoxysilane, trade name, KBM403, manufactured by Momentive Performance Materials Japan LLC) was added as further another organosilicon compound, and stirring was continued until pertaining reaction was completed, and thereby preparation of the second liquid was completed.

Next, as a material containing metal oxide, 200 parts by mass of a material containing particulate $ZrO_2$ was prepared in a second container under the atmosphere of 5° C. A sol-like material obtained by dispersing 40% by weight HZ-407 MH (trade name, manufactured by Nissan Chem. Ind. Ltd.) into methanol was used as the material containing particulate $ZrO_2$.

30 parts by mass of distilled water was added to the second container, and thereafter 0.16 parts by mass of DIBA (diisobutylamine) was further added. DIBA has pH adjusting function.

Further, 7.0 parts by mass of aluminum trisacetylacetonate (trade name: Alumichelate A(W); manufactured by Kawaken Fine Chemicals Co. Ltd) was added as a curing catalyst.

The aforesaid material containing particulate $ZrO_2$ has a pH of about 7, however, pH can be adjusted to 8-11 by adding distilled water, DIBA and the aluminum-based catalyst.

Next, as another material containing metal oxide, 130 parts by mass of a material containing particulate $TiO_2$ was added. In this example, a sol-like material obtained by dispersing 20% by weight of a rutile crystal $TiO_2$ (which is less photoactive and excellent in lightfastness) into PGM (propylene glycol monomethyl ether) was used as the material containing particulate $TiO_2$. Examples of the rutile crystal $TiO_2$ include Optolake 2120Z (trade name, manufactured by Catalysts and Chemicals Industries Co., Ltd.). PGM has high viscosity, therefore if PGM is used, film hardness of the hard coat layer can be increased.

The aforesaid rutile crystal $TiO_2$ has a pH of about 3.5-4.5. However, due to its good dispersion stability even in mild alkaline region, the rutile crystal $TiO_2$ can be added to the aforesaid solution having a pH of 8 to 11. By adding the rutile crystal $TiO_2$ sol, the first liquid having a pH of about 6 can be obtained. Incidentally, if the rutile crystal $TiO_2$ sol is added without adding the distilled water, DIBA and the aluminum-based catalyst, pH will become about 4-5, and therefore the $ZrO_2$ sol will be aggregated. Genaration of aggregation can be inhibited or even avoided by adding the water, the amine-based material (such as the DIBA) and the aluminum-based catalyst at time between the step of adding one metal oxide sol and the step of adding the other metal oxide sol.

Further, the material containing organosilicon compound (the second liquid) prepared in the first container was mixed into the material containing metal oxide (the first liquid) prepared in the second container. Since the material containing metal oxide prepared in the second container is a mild acidic solution added with appropriate amount of water, by mixing the material containing organosilicon compound prepared in the first container with the material containing metal oxide prepared in the second container, hydrolysis will progress slowly.

In the process of mixing the first liquid and the second liquid with each other, different material having different mass ratios of the solid content of the first liquid to the solid content of the second liquid shown in Examples 1 to 9 were prepared by changing mixing ratio of the first liquid to the second liquid.

[Solid Content of First Liquid/Solid Content of Second Liquid (Mass Ratio)]
Example 1 (30/70)
Example 2 (40/60)
Example 3 (45/55)
Example 4 (50/50)
Example 5 (55/45)
Example 6 (60/40)
Example 7 (65/35)
Example 8 (70/30)
Example 9 (75/25)

Finally, 0.3 parts by mass of a leveling agent was added in order to improve surface smoothness. In these examples, a material prepared by diluting Y7006 (trade name, manufactured by Dow Corning Toray Co., Ltd.) with PGM was used as the leveling agent. Incidentally, if an alcohol-based solvent (which is a commonly-used solvent) is used as the solvent, due to its high volatility and low viscosity, it will be difficult to form a film having a thickness of 3 μm or more. However, by using PGM as the solvent, it becomes possible to form a film having a desired thickness (including the thickness of 3 μm or more).

Preparation of the Hard Coat Liquid was Completed after the aforesaid material was hydrolyzed for a suitable time (3-14 days for example, and the time was set to 8 days in the present examples).

Such a hard coat liquid was coated on the surface of a lens substrate formed of thiourethane and epithio resin (trade name: EYRY; refractive index: 1.70; manufactured by HOYA Corporation) by dipping, and the coated film was cured by heating at 110° C. for one hour to form a hard coat layer, and further, an antireflection film was formed on the hard coat layer by vacuum evaporation, and thereby manufacture of a plastic lens having a hard coat layer of each of Examples 1 to 9 was completed.

In each of Examples 1 to 9, the antireflection film was formed by alternately laminating $SiO_2$ and $Ta_2O_5$ to form a laminated film. Evaluation of nano-indentation and evaluation of crack were performed on the plastic lenses having the hard coat layer formed thereon using the hard coat liquids prepared by Examples 1 to 9.

As the evaluation of nano-indentation, the hardness was measured using a hardness testing device ENT-2100 (trade name, manufactured by Elionix, Inc.) at an indentation load of 100 mgf and indentation depth of several nm. The results are shown in Table 1.

TABLE 1

| Example | Mass Ratio (First liquid/ Second liquid) | Nano-indentation Hardness (mgf/μm$^2$) | |
|---|---|---|---|
| 1 | 30/70 | 56 | ← Weak (film hardness is low and susceptible to scratches) |
| 2 | 40/60 | 74 | ← Weak (film hardness is low and susceptible to scratches) |
| 3 | 45/55 | 83 | |
| 4 | 50/50 | 92 | |
| 5 | 55/45 | 110 | |
| 6 | 60/40 | 118 | |
| 7 | 65/35 | 125 | |
| 8 | 70/30 | 132 | |
| 9 | 75/25 | 138 | |

It can be known from Table 1 that the greater the mass ratio of the first liquid to the second liquid is, the higher the film hardness is. In Examples 1 and 2, the mass ratios of the solid content of the first liquid to the solid content of the second liquid are respectively small values of 30/70 and 40/60, and the nano-indentation hardnesses are respectively 56 mgf/μm$^2$ and 74 mgf/μm$^2$. Since the film hardness is low and therefore susceptible to scratches, the lenses manufactured using the hard coat liquids prepared by Examples 1 and 2 are not suitable for practical use. It can be said that good properties can be obtained when the content of the first liquid is equal to or more than 45% by mass (i.e., mass ratio of the solid content of the first liquid to the solid content of the second liquid is equal to or more than 45/55) if the plastic lens is used for making spectacles.

Further, evaluation of crack was performed by observing surface state of the lens after the thermal curing treatment. The results are shown in Table 2.

TABLE 2

| Example | Mass Ratio (First liquid/ Second liquid) | Crack | |
|---|---|---|---|
| 1 | 30/70 | Not found | |
| 2 | 40/60 | Not found | |
| 3 | 45/55 | Not found | |
| 4 | 50/50 | Not found | |
| 5 | 55/45 | Not found | |
| 6 | 60/40 | Not found | |
| 7 | 65/35 | Not found | |
| 8 | 70/30 | Found | |
| 9 | 75/25 | Found | ← Brittle fracture occurs |

It can be known that the greater the mass ratio of the first liquid to the second liquid is, the more easily the hard coat layer is susceptible to crack. Brittle fracture occurred in Example 9 in which the mass ratio of the solid content of the first liquid and the solid content of the second liquid was 75/25. It is presumed that the brittle fracture was occurred in the hard coat layer after being cured by heating. It can be known that the film becomes susceptible to brittle fracture when content of the first liquid is increased to about 70% by mass (i.e., when mass ratio of the solid content of the first liquid to the solid content of the second liquid is increased to about 70/30).

Next, different hard coat liquids were prepared respectively for the case where one metal oxide and one organosilicon compound were contained and for the case where two or more metal oxides and two or more organosilicon compounds were contained by changing mixing ratio of the first liquid to the second liquid, and evaluations of strength and optical characteristics were performed. In addition to the nano-indentation and cracks, evaluations were also performed to evaluate scratch resistance and interference fringe, wherein the evaluation of scratch resistance was performing by carrying out a scratch test using steel wool and evaluating the result, and the evaluation of interference fringe was performing by observation to see whether or not the interference fringe was caused.

First, examples in which the hard coat layer was formed using the hard coat liquid containing one metal oxide and one organosilicon compound will be described below. In the following examples, different hard coat liquids were prepared using the materials shown in Table 3. The numbers in Table 3 represent contents (% by mass) of the respective materials. Incidentally, the respective materials were mixed in the order as shown in Table 3. In other words, in Comparative Examples 1 and 2 and Examples 1 to 3, the respective materials were mixed in the order of: rutile crystal $TiO_2$ sol, γ-GPS, hydrochloric acid, methanol, catalyst and leveling agent. Further, the materials of rutile crystal $TiO_2$ sol, γ-GPS and catalyst and leveling agent were identical to those described in the aforesaid Example 1 to 8. Concentration of hydrochloric acid was 0.01 mole/L. Concentration of the solid content in the obtained hard coat liquid was 20%. In the solid content, mass ratio of the metal oxide filler contained in the sol to the organosilicon compound was mass ratio of the solid content of the first liquid to the solid content of the second liquid in each of the respective comparative examples and examples. Mass ratios of the respective comparative examples and examples are described as below.

[Solid Content of First Liquid/Solid Content of Second Liquid (Mass Ratio)]
  Comparative Example 1 (30/70)
  Example 1 (45/55)
  Example 2 (55/45)
  Example 3 (65/35)
  Comparative Example 2 (75/25)

TABLE 3

| Material | Comparative Example 1 30/70 | Example 1 45/55 | Example 2 55/45 | Example 3 65/35 | Comparative Example 2 75/25 |
|---|---|---|---|---|---|
| $TiO_2$Sol | 15% | 23% | 28% | 33% | 38% |
| γ-GPS | 14% | 11% | 9% | 7% | 5% |
| Hydrochloric acid | 4.8% | 3.8% | 3.1% | 2.4% | 1.7% |
| MeOH | 65.15% | 61.15% | 58.85% | 56.55% | 54.25% |
| Catalyst | 1% | 1% | 1% | 1% | 1% |
| Leveling agent | 0.05% | 0.05% | 0.05% | 0.05% | 0.05% |

Next, examples in which the hard coat layer was formed using the hard coat liquid containing two metal oxides and three organosilicon compounds will be described below. In the following examples, the hard coat liquids were prepared using the materials shown in Table 4. Similar to Table 3, the numbers in Table 4 represent contents (% by mass) of the respective materials. The respective materials were mixed in the order as the aforesaid Example 1 to 8 described with reference to FIG. 1. Further, the respective materials were identical to the materials used in Example 1 to 8. Concentration of the solid content in the obtained hard coat liquid was 30%. In the solid content, mass ratio of the metal oxide filler contained in the sol to the organosilicon compound was mass ratio of the solid content of the first liquid to the solid content of the second liquid of each of the respective comparative examples and examples. Mass ratios of the respective comparative examples and examples are described as below.

[Solid Content of First Liquid/Solid Content of Second Liquid (Mass Ratio)]
  Comparative Example 3 (30/70)
  Example 4 (45/55)
  Example 5 (55/45)
  Example 6 (65/35)
  Comparative Example 4 (75/25)

TABLE 4

| Material | Comparative Example 3 30/70 | Example 4 45/55 | Example 5 55/45 | Example 6 65/35 | Comparative Example 4 75/25 |
|---|---|---|---|---|---|
| $ZrO_2$Sol | 15% | 22% | 27% | 32% | 37% |
| R-$TiO_2$Sol | 15% | 22% | 27% | 32% | 37% |
| γ-GPS | 19% | 15% | 12% | 9% | 7% |
| γ-APS | 0.99% | 0.78% | 0.64% | 0.50% | 0.35% |
| γ-IPS | 1.11% | 0.87% | 0.71% | 0.55% | 0.40% |
| Distilled water | 6.83% | 6.28% | 5.57% | 4.87% | 3.16% |
| DAA | 10% | 10% | 10% | 10% | 10% |
| PGM | 31% | 22% | 16% | 10% | 4% |
| Catalyst | 1% | 1% | 1% | 1% | 1% |
| Leveling agent | 0.05% | 0.05% | 0.05% | 0.05% | 0.05% |
| DIBA | 0.02% | 0.02% | 0.03% | 0.03% | 0.04% |

Incidentally, in each of the examples shown in Tables 3 and 4, the antireflection film was formed by alternately laminating $SiO_2$ and $Ta_2O_5$ by vacuum evaporation.

Evaluations of scratch, nano-indentation, crack and interference fringe were performed on plastic lenses having the hard coat layers formed thereon using the hard coat liquids prepared by Examples 1 to 6 and Comparative Examples 1 to 4 using the following methods.

First, as the evaluation of scratch, a scratch test was performed using steel wool (#0000) to scratch the plastic lens back and forth for 20 times under a load of 4 kg, and the result of the test was evaluated. Evaluation criteria of the scratch test is shown in Table 5.

TABLE 5

| Evaluation Criteria of Scratch | |
|---|---|
| ○○ | Almost no scratch |
| ○ | Less than 10 scratches were found |
| Δ | 10 to 29 scratches were found |
| X | 30 or more scratches were found |

Further, as the evaluation of nano-indentation, nano indentation hardness was measured using an hardness testing device ENT-2100 (trade name, manufactured by Elionix, Inc.) under a load of 100 mgf. Evaluation criteria of the nano-indentation is shown in Table 6.

TABLE 6

| Evaluation Criteria of Nano-indentation | |
|---|---|
| ○○ | 100 or more |
| ○ | 80 to 99 |
| Δ | 60 to 79 |
| X | Less than 60 |

Further, the evaluation of crack was performed by observation to see whether or not the crack was caused, and the evaluation of interference fringe was performed by visually checking the appearance. The visual check results of the interference fringe were divided into three classes represented by three marks of "○○", "○" and "X", in which "○○" representing a state where interference fringe was not observed, "○" representing a state where interference fringe was almost not observed, and "X" representing a state where interference fringe was observed. The results are shown in Table 7.

TABLE 7

| | Scratch | Nano-indentation | Crack | Interference Fringe |
|---|---|---|---|---|
| Example 1 | ○ | ○ | Not found | ○ |
| Example 2 | ○○ | ○○ | Not found | ○ |
| Example 3 | ○○ | ○○ | Not found | ○ |
| Example 4 | ○ | ○ | Not found | ○○ |
| Example 5 | ○○ | ○○ | Not found | ○○ |
| Example 6 | ○○ | ○○ | Not found | ○○ |
| Comparative Example 1 | X | X | Not found | X |
| Comparative Example 2 | ○○ | ○○ | Found | ○ |
| Comparative Example 3 | X | X | Not found | X |
| Comparative Example 4 | ○○ | ○○ | Found | ○○ |

It can be known from Table 7 that, in Examples 1 to 6 (in which the mass ratio of the solid content of the first liquid to the solid content of the second liquid falls within a range of 45/55 to 65/35), good evaluation results of scratch, nano-indentation, crack and interference fringe can be obtained. In contrast, in Comparative Examples 1 to 4, good evaluation results of scratch, nano-indentation and good evaluation result of crack could not obtained at the same time, and therefore excellent plastic lens can not be obtained. Thus, in the present invention, the mass ratio of the solid content of the first liquid (which is a material containing metal oxide) to the solid content of the second liquid (which is a material containing organosilicon compound) falls within a range of 45/55 to 65/35.

It can be known from Table 7 that, in Examples 2, 3, 5 and 6 (in which the mass ratio of the solid content of the first liquid to the solid content of the second liquid falls in a range of 55/45 to 65/35), better evaluation results of scratch and nano-indentation can be obtained. Thus, in the present invention, it is preferred that the mass ratio of the solid content of the first liquid to the solid content of the second liquid falls within a range of 55/45 to 65/35.

Further, it can be known from Table 7 that, in Examples 5 and 6 (in which two or more metal oxides and two or more organosilicon compounds were contained in the hard coat liquid), in addition to the evaluation results of scratch and nano-indentation, the evaluation results of crack and interference fringe are also excellent. Thus, in the present invention, it is more preferred that the plastic lens is manufactured using a hard coat liquid in which the mass ratio of the solid content of the first liquid to the solid content of the second liquid falls within a range of 55/45 to 65/35 and in which two or more metal oxides and two or more organosilicon compounds are contained.

Incidentally, in the case where γ-GPS, γ-APS and γ-IPS are used as the second liquid, if mixing ratio of γ-GPS/(γ-APS+γ-IPS) exceeds 99/1, adhesion of the hard coat layer to the lens substrate will decease. Further, if mixing ratio of γ-GPS/(γ-APS+γ-IPS) is less than 80/20, film hardness will decease. Thus, when these materials are used, it is preferred that mixing ratio of γ-GPS/(γ-APS+γ-IPS) falls within a range of 99/1 to 80/20.

As describe above, according to the plastic lens and manufacturing method thereof of the present invention, by setting the mass ratio of the metal oxide to the organosilicon compound contained in the hard coat layer to a particular range through suitably selecting the mixing ratio of the metal oxide to the organosilicon compound, the film hardness of the hard coat layer can be increased while cracks can be avoided.

(2) Examples of Second Aspect of the Present Invention

For explaining the second aspect of the present invention, comparative examples and examples are given in which different plastic lenses having different thickness of the primer layer and different thickness of the hard coat layer were manufactured, and evaluations of film hardness, crack and interference color were performed on these plastic lenses. The thickness of the hard coat layer was controlled by changing the mixing ratio of the materials of the hard coat liquid so as to change the percentage of effective components (which do not volatilize) contained in the hard coat liquid. The examples are described below.

In the following examples, a hard coat liquid containing two metal oxides of $TiO_2$ and $ZrO_2$, a composition obtained by mixing the material represented by General Formula (1) and the material represented by General Formula (2), and other organosilicon compound(s) was used as a material for forming a general hard coat layer on a lens substrate having high refractive index.

First, as a solvent for the organosilicon compounds, DAA (diacetone alcohol) is prepared in a first container at room temperature. Herein, γ-APS (γ-aminopropyl trimethoxysilane, trade name of A-1110, manufactured by Momentive Performance Materials Japan LLC) was added as a first organosilicon compound, and stirring was started. Thereafter, γ-IPS (γ-isocyanatopropyl trimethoxysilane, trade name, Y-5187, manufactured by Momentive Performance Materials Japan LLC) was added as another organosilicon compound, and stirring was continued. After stirring had continued for several hours so that reaction of these materials had been completed, γ-GPS (γ-glycidoxypropyl trimethoxysilane, trade name, KBM403, manufactured by Momentive Performance Materials Japan LLC) was added as further another organosilicon compound, and stirring was continued until the pertaining reaction was completed, and thereby the preparation of the material containing the composition obtained by mixing the material represented by General Formula (1) and the material represented by General Formula (2) was completed.

Next, as a material containing metal oxide, a material containing particulate $ZrO_2$ was prepared in a second container under the atmosphere of 5° C. A sol-like material obtained by dispersing 40% by weight of HZ-407 MH (trade name, manufactured by Nissan Chem. Ind. Ltd.) into methanol was used as the material containing particulate $ZrO_2$.

Further, distilled water was added to the second container, and then DIBA (diisobutylamine) was further added. DIBA has pH adjusting function.

Further, aluminum trisacetylacetonate (trade name: Alumichelate A(W); manufactured by Kawaken Fine Chemicals Co. Ltd) was added as a curing catalyst.

The aforesaid material containing particulate $ZrO_2$ has a pH of about 7, however, pH can be adjusted to about 8-11 by adding distilled water, DIBA and the aluminum-based catalyst.

Next, as another material containing metal oxide, a material containing particulate $TiO_2$ was added. In this example, a sol-like material obtained by dispersing 20% by weight of a rutile crystal $TiO_2$ (which is less photoactive and excellent in lightfastness) into PGM (propylene glycol monomethyl ether) was used as the material containing particulate $TiO_2$. Examples of the rutile crystal $TiO_2$ include Optolake 2120Z (trade name, manufactured by Catalysts and Chemicals Industries Co., Ltd.). PGM has high viscosity, therefore if PGM is used, a thick hard coat layer can be formed, and therefore thickness of the hard coat layer is easy to control.

The aforesaid rutile crystal $TiO_2$ has a pH of about 3.5-4.5. However, due to its good dispersion stability even in mild alkaline region, the rutile crystal $TiO_2$ can be added to the aforesaid solution having a pH of 8 to 11. By adding the rutile crystal $TiO_2$ sol, a material containing metal oxide having a pH of about 6 can be obtained. Incidentally, if the rutile crystal $TiO_2$ sol is added without adding the distilled water, DIBA and the aluminum-based catalyst, pH will become about 4-5, and therefore the $ZrO_2$ sol will be aggregated. Genaration of aggregation can be inhibited or even avoided by adding the water, the amine-based material (such as the DIBA) and the aluminum-based catalyst at time between the step of adding one metal oxide sol and the step of adding the other metal oxide sol.

If the aluminum-based catalyst mixed is less than 0.3% by weight, the function both as a pH adjusting agent and a catalyst will be insufficient. If the aluminum-based catalyst mixed exceeds 1.8% by weight, the reaction will be excessively promoted. Thus, it is preferred that the amount of the aluminum-based catalyst mixed falls within a range of 0.3% to 1.8% by weight.

Further, the material containing the composition obtained by mixing the materials represented by General Formulas (1) and (2) in the first container was mixed into the material containing the metal oxides prepared in the second container. Since the material containing metal oxide prepared in the second container is a mild acidic solution added with appropriate amount of water, by mixing the material containing organosilicon compound prepared in the first container with the material containing metal oxide prepared in the second container, hydrolysis will progress slowly.

Finally, a leveling agent was added in order to improve surface smoothness. In this example, a material prepared by diluting Y7006 (trade name, manufactured by Dow Corning Toray Co., Ltd.) with PGM was used as the leveling agent. Incidentally, if an alcohol-based solvent (which is a commonly-used solvent) is used as the solvent, due to its high volatility and low viscosity, it will be difficult to form a film having a thickness of 3 μm or more. However, by using PGM as the solvent, it becomes possible to form a film having a desired thickness (including the thickness of 3 μm or more).

Preparation of the Hard Coat Liquid was Completed after the aforesaid material was hydrolyzed for a suitable time (3-14 days for example, and the time was set to 8 days in the present example).

Different compositions were made by changing the mixing ratio to the mixing ratios shown in Table 8 to adjusting the thickness of the hard coat layer. The weight ratios of the effective components contained in Compositions 1 to 6 are described below.

[Percentage of Effective Components (which do volatilize), Film Thickness]

Composition 1: 15 wt. %, 1 μm

Composition 2: 17 wt. %, 1.5 μm

Composition 3: 20 wt. %, 2 μm

Composition 4: 25 wt. %, 3 μm

Composition 5: 30 wt. %, 4 μm

Composition 6: 35 wt. %, 5 μm

Composition 7: 40 wt. %, 6 μm

TABLE 8

| Material | Composition 1 15 wt % | Composition 2 17 wt % | Composition 3 20 wt % | Composition 4 25 wt % | Composition 5 30 wt % | Composition 6 35 wt % | Composition 7 40 wt % |
| --- | --- | --- | --- | --- | --- | --- | --- |
| $ZrO_2$ Sol | 14% | 16% | 18% | 23% | 27% | 32% | 37% |
| R-$TiO_2$ Sol | 14% | 16% | 18% | 23% | 27% | 32% | 37% |
| γ-GPS | 6% | 7% | 8% | 10% | 12% | 14% | 16% |
| γ-APS | 0.32% | 0.36% | 0.42% | 0.53% | 0.64% | 0.74% | 0.85% |
| γ-IPS | 0.36% | 0.40% | 0.48% | 0.59% | 0.71% | 0.83% | 0.95% |
| Distilled water | 2.24% | 2.16% | 4.02% | 3.8% | 5.57% | 5.35% | 6.12% |
| DAA | 10% | 10% | 10% | 10% | 10% | 5% | 1% |
| PGM | 52% | 47% | 40% | 28% | 16% | 9% | 0% |
| Catalyst | 1% | 1% | 1% | 1% | 1% | 1% | 1% |
| Leveling agent | 0.05% | 0.05% | 0.05% | 0.05% | 0.05% | 0.05% | 0.05% |
| DIBA | 0.03% | 0.03% | 0.03% | 0.03% | 0.03% | 0.03% | 0.03% |
| Film thickness (μm) | 1 | 1.5 | 2 | 3 | 4 | 5 | 6 |

Crystal Coat (trade name, a urethane-based $TiO_2$-containing material manufactured by SDC Technologies-Asia Co., Ltd.) was used as the material of the primer layer. The thickness of the primer layer was also controlled by changing the concentration of the solid content of the aforesaid material. Composition example and film thickness of the primer layer are shown in Table 9.

TABLE 9

<Composition examples of Primer Layer>

| | Concentration of Solid Content(wt %) | Film thickness (μm) |
|---|---|---|
| Composition 1 | 2 | 0.1 |
| Composition 2 | 5 | 0.25 |
| Composition 3 | 8 | 0.5 |
| Composition 4 | 11 | 0.75 |
| Composition 5 | 15 | 1 |
| Composition 6 | 20 | 1.5 |
| Composition 7 | 25 | 2 |

The primer layer material of Compositions 1 to 6 shown in Table 9 was coated on the surface of a lens substrate made of EYRY (trade name, a thiourethane and epithio resin manufactured by HOYA Corporation, refractive index 1.70) by dipping, and the coated material was cured by heating at 100° C. for 40 minutes to form a primer layer. The hard coat liquid of Compositions 1 to 6 shown in Table 1 was coated on the primer layer by dipping, and the coated hard coat liquid was cured by heating at 75° C. for 20 minutes to form a hard coat layer. Thereafter, curing treatment was further performed by heating at 110° C. for one hour to entirely cure the primer layer and hard coat layer. Further, an antireflection film was formed by vacuum evaporation, and thereby manufacture of a plastic lens having changed thicknesses of primer layer and hard coat layer was completed. In each of Examples 1 to 6, the antireflection film was formed by alternately laminating $SiO_2$ and $Ta_2O_5$ to form a laminated film.

Evaluations of scratch test, crack check and interference color check were performed.

First, a scratch test was performed using steel wool (#0000) to scratch the plastic lens back and forth for 20 times under a load of 4 kg, and the result of the test was evaluated. The evaluation result and evaluation criteria of the scratch test are shown in Tables 10 and 11.

FIG. 6 shows photos of surfaces of the plastic lenses respectively having a hard coat layer of 1.5 μm, 2 μm, 5 μm in thickness and a primer layer of 1.5 μm, 1 μm, 0.75 μm, 0.5 μm in thickness after being subjected to the scratch test.

It can be known from the scratch test shown in Table 10 that, when the thickness of the hard coat layer is 1 μm, the lens has low scratch resistance and therefore is not suitable for practical use. It can be clearly known from FIG. 6 that, when the thickness of the hard coat layer is 1.5 μm, the lens has few scratches if the thickness of the primer layer is equal to or smaller than 0.75 μm. It is also known that, when the thickness of the hard coat layer is 2 μm, good result can be obtained if the thickness of the primer layer is equal to or smaller than 1 μm.

Thus, it can be known from the above results that good scratch resistance can be obtained when the thickness of the hard coat layer is equal to or greater than two times of the thickness of the primer layer.

Further, a visual confirmation was performed on the plastic lenses each having the primer layer and hard coat layer formed thereon after the thermal curing treatment to evaluate the crack. The evaluation result and evaluation criteria of crack are shown in Tables 12 and 13.

TABLE 10

<Evaluation Result of Scratch>

| | | | Hard Coat Layer | | | | | | |
|---|---|---|---|---|---|---|---|---|---|
| | | | Composition 1 1 μm | Composition 2 1.5 μm | Composition 3 2 μm | Composition 4 3 μm | Composition 5 4 μm | Composition 6 5 μm | Composition 7 6 μm |
| Primer Layer | Composition 1 | 0.1 μm | X | ⊚ | ⊚ | ⊚ | ⊚ | ⊚ | ⊚ |
| | Composition 2 | 0.25 μm | X | ⊚ | ⊚ | ⊚ | ⊚ | ⊚ | ⊚ |
| | Composition 3 | 0.5 μm | X | ⊚ | ⊚ | ⊚ | ⊚ | ⊚ | ⊚ |
| | Composition 4 | 0.75 μm | X | ○ | ⊚ | ⊚ | ⊚ | ⊚ | ⊚ |
| | Composition 5 | 1.0 μm | X | Δ | ○ | ⊚ | ⊚ | ⊚ | ⊚ |
| | Composition 6 | 1.5 μm | X | X | Δ | ⊚ | ⊚ | ⊚ | ⊚ |
| | Composition 7 | 2.0 μm | X | X | X | ○ | ⊚ | ⊚ | ⊚ |

TABLE 11

<Evaluation Criteria of Scratch>

| | |
|---|---|
| ⊚ | No remarkable scratches were found |
| ○ | A few scratches were found |
| Δ | Remarkable scratches were found |
| X | Prominent scratches were found |

TABLE 12

<Evaluation Criteria of Crack>

| | | | Hard Coat Layer | | | | | | |
|---|---|---|---|---|---|---|---|---|---|
| | | | Composition 1 1 μm | Composition 2 1.5 μm | Composition 3 2 μm | Composition 4 3 μm | Composition 5 4 μm | Composition 6 5 μm | Composition 7 6 μm |
| Primer Layer | Composition 1 | 0.1 μm | ○ | ○ | ○ | ○ | ○ | ○ | X |
| | Composition 2 | 0.25 μm | ○ | ○ | ○ | ○ | ○ | ○ | X |
| | Composition 3 | 0.5 μm | ○ | ○ | ○ | ○ | ○ | ○ | X |
| | Composition 4 | 0.75 μm | ○ | ○ | ○ | ○ | ○ | ○ | X |
| | Composition 5 | 1.0 μm | ○ | ○ | ○ | ○ | ○ | ○ | X |
| | Composition 6 | 1.5 μm | ○ | ○ | ○ | ○ | ○ | ○ | X |
| | Composition 7 | 2.0 μm | ○ | ○ | ○ | ○ | ○ | ○ | X |

TABLE 13

<Evaluation Result of Crack>

| | |
|---|---|
| ○ | Almost not crack |
| X | Cracks were found |

It can be known from Table 12 that the cracks are caused when the thickness of the hard coat layer is 6 μm. Thus, it is preferred that the thickness of the hard coat layer is less than 6 μm, and it is more preferred that the thickness of the hard coat layer is equal to or less than 5 μm.

Further, a visual confirmation was performed on the plastic lenses each having the antireflection film formed thereon to evaluate the interference color. The evaluation result and evaluation criteria of interference color are shown in Tables 14 and 15.

TABLE 14

<Evaluation Result of Interference color>

| | | | Hard Coat Layer | | | | | | |
|---|---|---|---|---|---|---|---|---|---|
| | | | Composition 1 1 μm | Composition 2 1.5 μm | Composition 3 2 μm | Composition 4 3 μm | Composition 5 4 μm | Composition 6 5 μm | Composition 7 6 μm |
| Primer Layer | Composition 1 | 0.1 μm | ○ | ○ | ○ | ○ | ○ | ○ | ○ |
| | Composition 2 | 0.25 μm | ○ | ○ | ○ | ○ | ○ | ○ | ○ |
| | Composition 3 | 0.5 μm | ○ | ○ | ○ | ○ | ○ | ○ | ○ |
| | Composition 4 | 0.75 μm | ○ | ○ | ○ | ○ | ○ | ○ | ○ |
| | Composition 5 | 1.0 μm | ○ | ○ | ○ | ○ | ○ | ○ | ○ |
| | Composition 6 | 1.5 μm | ○ | ○ | ○ | ○ | ○ | ○ | ○ |
| | Composition 7 | 2.0 μm | ○ | ○ | ○ | ○ | ○ | ○ | ○ |

TABLE 15

<Evaluation Criteria of Crack>

| | |
|---|---|
| ○ | Interference color change was not observed |
| X | Interference color change was observed |

As can be known from Table 7, no interference color change was observed in all examples. Thus, it can be known that interference color change will not occur when the thickness of the primer layer falls within a range of 0.1 μm to 2.0 μm and the thickness of the hard coat layer falls within a range of 1 μm to 6 μm.

A total evaluation result obtained by totaling the results shown in Tables 10, 12 and 14 is shown in Table 16.

TABLE 16

<Total Evaluation>

| | | | Hard Coat Layer | | | | | | |
|---|---|---|---|---|---|---|---|---|---|
| | | | Composition 1  1 μm | Composition 2  1.5 μm | Composition 3  2 μm | Composition 4  3 μm | Composition 5  4 μm | Composition 6  5 μm | Composition 7  6 μm |
| Primer Layer | Composition 1 | 0.1 μm | X | ○○ | ○○ | ○○ | ○○ | ○○ | X |
| | Composition 2 | 0.25 μm | X | ○○ | ○○ | ○○ | ○○ | ○○ | X |
| | Composition 3 | 0.5 μm | X | ○○ | ○○ | ○○ | ○○ | ○○ | X |
| | Composition 4 | 0.75 μm | X | ○ | ○○ | ○○ | ○○ | ○○ | X |
| | Composition 5 | 1.0 μm | X | Δ | ○ | ○○ | ○○ | ○○ | X |
| | Composition 6 | 1.5 μm | X | X | Δ | ○○ | ○○ | ○○ | X |
| | Composition 7 | 2.0 μm | X | X | X | ○ | ○○ | ○○ | X |

It can be known from the result shown in Table 16 that, in the case where a hard coat layer containing the materials represented by General Formulas (1) and (2) and metal oxide(s) is coated on a primer layer, sufficient scratch resistance can be obtained when the thickness of the hard coat layer is equal to or greater than two times of the thickness of the primer layer.

Further, when the thickness of the hard coat layer is less than 6 μm, more preferably, when the thickness of the hard coat layer is equal to or less than 5 μm, occurrence of crack can be avoided.

When the total thickness of the hard coat layer and primer layer is equal to or less than 7 μm, occurrence of crack can be reliably inhibited.

Further, when the thickness of the hard coat layer is 1 μm, scratch resistance will decrease independently of the thickness of the primer layer. Thus, scratch resistance can be reliably improved when the thickness of the hard coat layer is equal to or more than 1 μm and when the thickness of the hard coat layer is equal to or greater than two times of the thickness of the primer layer.

Incidentally, as described above, interference color change can be inhibited when the thickness of the primer layer falls within a range of 0.1 μm to 2.0 μm and the thickness of the hard coat layer falls within a range of 1 μm to 6 μm.

As described above, according to the plastic lens and manufacturing method thereof of the present invention, it is possible to improve scratch resistance, inhibit occurrence of crack, and inhibit non-uniform interference color by properly selecting the hard coat layer and properly selecting the relation between the thickness of the primer layer and thickness of the hard coat layer.

(3) Examples of Third Aspect of the Present Invention

Next, examples and comparative examples will be described based on the third aspect of the present invention in which a material is manufactured by mixing two metal oxides (i.e., a rutile titania sol and a zirconia sol) and three organosilicon compounds with each other. In the examples, different hard coat liquids were prepared by changing the mixing ratio of the organosilicon compound materials; and in the comparative example, different hard coat liquids were prepared by changing conditions such as the order to add the catalyst. Thereafter, plastic lenses were manufactured by coating the prepared hard coat liquids on the surface of the lens substrate thereof and curing the coated hard coat liquids. Further, evaluations were performed to evaluate aggregation during preparation of the hard coat liquid (to see whether or not aggregation was caused), to evaluate transparency, YI, scratch resistance and impact resistance after the lenses were manufactured.

[1] Example 1

First, the organosilicon compounds were prepared following the procedure described below. As a solvent for the organosilicon compounds, DAA (diacetone alcohol) is prepared in a first container at room temperature (30° C. in this case). First, γ-APS (γ-aminopropyl trimethoxysilane, trade name of A-1110, manufactured by Momentive Performance Materials Japan LLC) was added as a first organosilicon compound, and stirring was started. Thereafter, γ-IPS (γ-isocyanatopropyl trimethoxysilane; trade name: Y-5187; manufactured by Momentive Performance Materials Japan LLC) was added as another organosilicon compound, and stirring was continued. After stirring had continued for several hours so that reaction of these materials had been completed, γ-GPS (γ-glycidoxypropyl trimethoxysilane, trade name, KBM403, manufactured by Momentive Performance Materials Japan LLC) was added as further another organosilicon compound, and stirring was continued until the pertaining reaction was completed, and thereby preparation of the organosilicon compound material was completed.

Next, as a material containing metal oxide, a material containing particulate $ZrO_2$ was prepared in a second container under the atmosphere of 5° C. A sol-like material obtained by dispersing 40% by weight of HZ-407 MH (trade name, manufactured by Nissan Chem. Ind. Ltd.) into methanol was used as the material containing particulate $ZrO_2$. PH of the material was about 7.

Then, distilled water was added to the second container, and DIBA (diisobutylamine) was further added as an amine-based material.

When adjusting pH with the chelate, if the distilled water is added before the second sol has been added, dispersion stability of the sol can be improved. Note that, when adding the water, since heat will be generated when the water is mixed with the methanol added as a dispersion solven, temperature control is important at this stage.

If mixing is performed at temperatures higher than room temperature (about 30° C.), dispersion stability of the sol will decrease, and therefore there is a concern that the lens will become cloudy when the hard coat liquid is coated on the surface of the plastic lens and cured. Thus, it is preferred that the aluminum-based catalyst is added into the material containing the rutile titania sol or the zirconia sol at temperatures equal to or lower than room temperature (to be specific, at temperature equal to or lower than 30° C.). If the aluminum-based catalyst is added after the sol is cooled to a temperature lower than 0° C., cost will increased to result no particular advantage. Thus, it is preferred that the aluminum-based catalyst is added at temperature of 0° C. to 30° C.

Further, as the curing aluminum-based catalyst, aluminum trisacetylacetonate (trade name: Alumichelate A(W); manufactured by Kawaken Fine Chemicals Co. Ltd) was added into the zirconia sol material, and thereby pH of the material becomes about 8 to 11.

Next, a sol obtained by dispersing Optolake 2120Z (trade name, manufactured by Catalysts and Chemicals Industries Co., Ltd.) with PGM (propylene glycol monomethyl ether) was added as the rutile titania sol. PGM has high viscosity, and therefore if PGM is used, a thick hard coat layer can be formed.

The aforesaid rutile titania sol has a pH of about 3.5-4.5. However, due to its good dispersion stability even in mild alkaline region, the rutile crystal $TiO_2$ can be added to the aforesaid solution having a pH of 8-11 without causing aggregation. By adding the rutile titania sol, pH of the material in the second container becomes about 6. Incidentally, if the rutile titania sol is added without adding the aluminum-based catalyst, pH will become about 4-5, and therefore the zirconia sol will be aggregated. However, generation of the aggregation can be inhibited or even avoided by previously adding the aluminum-based catalyst into one metal oxide sol, and then adding the other metal oxide sol.

Further, the material containing organosilicon compound prepared in the first container was mixed with the material containing metal oxide prepared in the second container. Since the material containing metal oxide prepared in the second container is a mild acidic solution added with appropriate amount of water, by mixing the material containing organosilicon compound prepared in the first container with the material containing metal oxide, hydrolysis will progress slowly.

Finally, a leveling agent was added in order to improve surface smoothness. In this example, a material prepared by diluting Y7006 (trade name, manufactured by Dow Corning Toray Co., Ltd.) with PGM was used as the leveling agent. Incidentally, if an alcohol-based solvent (which is a commonly-used solvent) is used as the solvent, due to its high volatility and low viscosity, it will be difficult to form a film having a thickness of 3 μm or more. However, by using PGM as the solvent, it becomes possible to form a film having a desired thickness (including the thickness of 3 μm or more).

Preparation of the Hard Coat Liquid was Completed after the aforesaid material was hydrolyzed for a suitable time (3-14 days for example, and the time was set to 8 days in the present example].

Table 17 shows mixing ratio (wt. %) of the respective materials used in respective examples (including Example 1) and comparative examples.

Such a hard coat liquid was coated on the surface of a lens substrate formed of thiourethane and epithio resin (trade name: EYRY; refractive index: 1.70; manufactured by HOYA Corporation) by dipping, and the coated film was cured by heating at 110° C. for one hour to form a hard coat layer, and further, an antireflection film was formed on the hard coat layer by vacuum evaporation, and thereby manufacture of a plastic lens having a hard coat layer was completed. Incidentally, the antireflection film was formed by alternately laminating $SiO_2$ and $Ta_2O_5$ to form a laminated film.

[2] Example 2

As can be known by seeing column "Example 2" of Table 17, in Example 2, the same materials as Example 1 was used to prepare the hard coat liquid, but the mixing ratio of γ-APS (γ-aminopropyl trimethoxysilane) to γ-IPS (γ-isocyanatopropyl trimethoxysilane) contained in the organosilicon compounds was different from that of Example 1. Such a hard coat liquid was used to manufacture a plastic lens having a hard coat layer.

[3] Example 3

In Example 3, the hard coat liquid was prepared using the same materials as those of Examples 1 and 2 except that γ-APS and γ-IPS were different. To be specific, instead of γ-APS (γ-aminopropyl trimethoxysilane) and γ-IPS (γ-isocyanatopropyl trimethoxysilane) used in Examples 1 and 2, γ-APS (γ-aminopropyl triethoxysilane, trade name of A-1110, manufactured by Momentive Performance Materials Japan LLC) and γ-IPS (γ-isocyanatopropyl triethoxysilane, trade name of A-1310, manufactured by Momentive Performance Materials Japan LLC) were used in Example 3. Incidentally, the other materials and the order for adding these materials were identical to those of Examples 1 and 2. The mixing ratio was shown in column "Example 3" of Table 17.

[4] Example 4

As can be known by seeing column "Example 4" of Table 17, in Example 4, the same materials as Example 3 is used to prepare the hard coat liquid, but the mixing ratio of γ-APS to γ-IPS was different from that of Example 3. The other materials, the mixing ratio thereof, and the order for adding these materials were identical to those of Examples 1 to 3.

[5] Example 5

As can be known by seeing column "Example 5" of Table 17, in Example 5, the same materials as Example 1 was used

TABLE 17

| Material | Example 1 | Example 2 | Example 3 | Example 5 | Example 6 | Comparative Example 1 | Comparative Example 2 | Comparative Example 3 |
|---|---|---|---|---|---|---|---|---|
| ZrO2 Sol | 27% | 27% | 27% | 27% | 27% | 27% | 27% | 27% |
| R-TiO2 Sol | 27% | 27% | 27% | 27% | 27% | 27% | 27% | 27% |
| γ-GPS | 12% | 12% | 12% | 12% | 12% | 12% | 12% | 12% |
| γ-APS | 0.64% | 0.63% | 0.64% | 0.63% | 0.64% | 0.64% | 0.64% | 0.64% |
| γ-IPS | 0.71% | 0.72% | 0.71% | 0.72% | 0.71% | 0.71% | 0.71% | 0.71% |
| Distilled water | 5.57% | 5.57% | 5.57% | 5.57% | 5.6% | 5.5% | 5.57% | 5.57% |
| DAA | 10% | 10% | 10% | 10% | 10% | 10% | 10% | 10% |
| PGM | 16% | 16% | 16% | 16% | 16% | 16% | 16% | 16% |
| Catalyst | 1% | 1% | 1% | 1% | 1% | 1% | 1% | 1% |
| Leveling agent | 0.05% | 0.05% | 0.05% | 0.05% | 0.05% | 0.05% | 0.05% | 0.05% |
| DIBA | 0.03% | 0.03% | 0.03% | 0.03% | 0% | 0.10% | 0.03% | 0.03% | to prepare the hard coat liquid except that the materials of Example 5 do not contain DIBA and the amount of the distilled water was increased corresponding to the reduction of the DIBA. The other materials, the mixing ratio thereof, and the order for adding these materials were identical to those of Example 1.

[6] Comparative Example 1

As can be known by seeing column "Comparative Example 1" of Table 17, in Comparative Example 1, the same materials as Examples 1 and 2 was used to prepare the hard coat liquid with the same mixing ratio except that the amount of DIBA is increased to 0.10% by mass and the amount of the distilled water was decreased corresponding to the increase of the DIBA. The other materials, the mixing ratio thereof, and the order for adding these materials were identical to that of Example 1.

[7] Comparative Example 2

In Comparative Example 2, the same materials as Example 1 were used to prepare the hard coat liquid with the same mixing ratio. However, compared to Example 1, in Comparative Example 2, the step of adding the aluminum-based catalyst was performed after the rutile titania sol was added into the zirconia sol. Other manufacturing steps were identical to those of Example 1.

[8] Comparative Example 3

In Comparative Example 3, the same materials as Example 1 were used to prepare the hard coat liquid with the same mixing ratio. However, Comparative Example 3 was different from Example 1 in that, the step of adding the aluminum-based catalyst was performed at 50° C., instead of 30° C. Other manufacturing steps were identical to those of Example 1.

Evaluations were performed on the hard coat liquids prepared in Examples 1 to 5 and Comparative Examples 1 to 3, and on the plastic lenses having the hard coat layers formed using the hard coat liquids prepared in Examples 1 to 5 and Comparative Examples 1 to 3.

<Evaluation Method>
1. Evaluation of Aggregation
Visual confirmation was performed to check whether or not aggregation was generated in a state where the rutile titania sol had been added during the process of preparing the hard coat liquid.
2. Evaluation of Transparency
Visual confirmation was performed on each of the manufactured plastic lenses to check whether or not the lens was cloudy or had foreign object mixed therein. Evaluation criteria of transparency is described below.
 OO: cloudy and foreign object are not found
 X: cloudy and foreign can be found
3. Weather Resistance
Yellowing of the lenses after thermal curing treatment was checked by measuring YI value with a spectrophotometer (manufactured by Hitachi, Ltd.). As evaluation of yellowing, YI was classified into four classes described below.
 O: less than 1.5
 O: 1.5 to 2.0
 Δ: 2.0 to 2.5
 X: more than 2.5

4. Scratch Test
Scratch test was performed using steel wool (#0000) to scratch the plastic lens back and forth for 20 times under a load of 4 kg, and visual confirmation was performed on the lens to check the scratch state of the surface thereof. Evaluation criteria of scratch is described below.
 O: Almost no scratch
 O: Less than 10 scratches were found.
 Δ: 10 to 29 scratches were found.
 X: 30 or more scratches were found.
5. Impact Resistance
Lenses having a 1.0 mm or 2.0 center thickness (referred to as "CT") and a power of 0.00D (diopter) were manufactured to be subjected to the FDA (Food and Drug Administration) drop-ball test, and evaluation criteria of the test was described below.
 O: Acceptable
 X: Unacceptable
The weight of the ball was 16 g. Criteria for determining whether or not the lens is acceptable: the lens is unacceptable if chap and/or crack are caused after the drop-ball test; and the lens is acceptable if the appearance of the lens does not change before and after the drop-ball test.

Result of the aforesaid evaluations is shown in Table 18.

TABLE 18

| Result of Evaluation | HC Liquid Aggregation | Transparency | YI | Scratch Resistance | Impact Resistance |
|---|---|---|---|---|---|
| Example 1 | Not found | O | OO | OO | O |
| Example 2 | Not found | O | OO | OO | O |
| Example 3 | Not found | O | OO | OO | O |
| Example 4 | Not found | O | OO | OO | O |
| Example 5 | Not found | O | OO | O | O |
| Comparative Example 1 | Not found | O | X | X | O |
| Comparative Example 2 | Found | X | O | Δ | O |
| Comparative Example 3 | Not found | X | OO | O | O |

As can be known from Table 18 that, in Examples 1 to 5, the aggregation caused during the process of preparing the hard coat liquid can be reliably inhibited. Further, it can be known that transparency is sufficiently good, and YI (which indicates yellowing) can be controlled to less than 1.5 (i.e., yellowing can be reliably inhibited). Further, it can be known that scratch resistance is excellent, and the impact resistance meets the criteria defined by FDA.

On the other hand, in can be known that, in Comparative Example 1, although aggregation caused during the process of preparing the hard coat liquid was not observed, since much DIBA (amine-based material) was added, YI was higher than 2.5, which means yellowing is caused. Further, good result in scratch resistance was not obtained.

Further, in can be known that, in Comparative Example 2, since the aluminum-based catalyst was added after the zirconia sol and the rutile titania sol had been mixed with each other, aggregation was caused at the time when the rutile titania sol was added. Further, transparency was not sufficient, and scratch resistance was not good enough to be supplied for practical use.

Further, in Comparative Example 3, since the aluminum-based catalyst was added at a temperature higher than 30° C., transparency was adversely affected. In contrast, in Examples 1 to 5, the aluminum-based catalyst was added at the temperature equal to or lower than 30° C., and therefore good result was obtained. Thus, it can be known that the aluminum-based catalyst is preferably added at a temperature equal to or lower than room temperature (to be specific, at temperature equal to or lower than 30° C.).

It can be known from the above results that, with the manufacturing method of hard coat liquid according to the present invention, aggregation caused during the process of preparing the hard coat liquid can be reliably inhibited. Further, with the manufacturing method of plastic lens according to the present invention, sufficient transparency of the lens can be achieved, and YI can be controlled to less than 1.5 and therefore yellowing can be sufficiently inhibited. Further, good characteristics in scratch resistance and impact resistance can be obtained.

Note, it is to be understood that the present invention is not limited to the embodiments and examples described above, and various modifications and applications can be made without departing from the spirit and scope of the present invention.

What is claimed is:

1. A method of manufacturing a plastic lens, comprising:
preparing a hard coat liquid;
coating the hard coat liquid on a plastic lens substrate to form a hard coat film; and
curing the hard coat film,
wherein the preparing of the hard coat liquid comprises:
preparing a rutile titania sol and a zirconia sol;
mixing an aluminum-based catalyst with one of the rutile titania sol and the zirconia sol to obtain a first mixture;
mixing the first mixture with the other of the rutile titania sol and the zirconia sol to obtain a second mixture comprising the rutile titania sol, the aluminum-based catalyst and the zirconia sol; and
mixing the second mixture with at least one organosilicon compound.

2. The method according to claim 1, wherein the aluminum-based catalyst comprises an aluminum chelate.

3. The method according to claim 2, wherein the aluminum chelate comprises at least one compound selected from the group consisting of ethyl acetoacetate aluminum diisopropylate, aluminum tris(ethyl acetoacetate), alkyl acetoacetate aluminum diisopropylate, aluminum monoacetylacetonate bis(ethyl acetoacetate), aluminum tris(acetylacetonate), and aluminium-monoisopropoxy monooleoxy ethyl acetoacetate.

4. The method according to claim 1, wherein the mixing of the aluminum-based catalyst is performed at a temperature equal to or lower than room temperature.

5. The method according to claim 1, wherein the second mixture further comprises an aliphatic amine.

6. The method according to claim 1, wherein the at least one organosilicon compound comprises at least one silane coupling agent selected from the group consisting of an amino-based silane coupling agent, an isocyanate-based silane coupling agent, an epoxy-based silane coupling agent, an acrylic-based silane coupling agent, a vinyl-based silane coupling agent, a methacrylic-based silane coupling agent, a styryl-based silane coupling agent, a ureido-based silane coupling agent, and a mercapto-based silane coupling agent.

7. The method according to claim 1, wherein the aluminum-based catalyst is mixed with the rutile titania sol to obtain the first mixture.

8. The method according to claim 1, wherein the aluminum-based catalyst is mixed with the zirconia sol to obtain the first mixture.

9. The method according to claim 1, wherein the at least one organosilicon compound comprises at least one compound selected from the group consisting of γ-isocyanatopropyl trimethoxysilane, γ-isocyanatopropyl dimethoxymethylsilane, γ-isocyanatopropyl triethoxysilane and γ-isocyanatopropyl diethoxymethylsilane.

10. The method according to claim 1, wherein the at least one organosilicon compound comprises at least one compound selected from the group consisting of γ-isocyanatopropyl trimethoxysilane, γ-isocyanatopropyl triethoxysilane and γ-isocyanatopropyltrialkoxysilane.

11. The method according to claim 1, wherein the first mixture further comprises an aliphatic amine.

12. The method according to claim 1, wherein the preparing of the hard coat liquid further comprises mixing an aliphatic amine with the one of the rutile titania sol and the zirconia sol before the mixing of the aluminum-based catalyst.

13. The method according to claim 12, wherein the aliphatic amine comprises diisobutylamine.

14. The method according to claim 1, wherein the preparing of the hard coat liquid further comprises controlling a temperature such that the aluminum-based catalyst is mixed at 0° C. to 30° C.

15. The method according to claim 1, wherein the second mixture further comprises at least one compound selected from the group consisting of $CeO_2$, $ZnO_2$, $SnO_2$ and ITO.

16. The method according to claim 1, further comprising forming an antireflection film on the hard coat layer.

* * * * *